United States Patent
Imamura et al.

(10) Patent No.: US 7,758,328 B2
(45) Date of Patent: Jul. 20, 2010

(54) INJECTION MOLDING MACHINE HAVING FUNCTION FOR MONITORING SCREW ROTATING TORQUES

(75) Inventors: Hiroshi Imamura, Yamanashi (JP); Wataru Shiraishi, Yamanashi (JP); Satoshi Takatsugi, Yamanashi (JP)

(73) Assignee: Fanuc Ltd (JP)

( * ) Notice: Subject to any disclaimer, the term of this patent is extended or adjusted under 35 U.S.C. 154(b) by 214 days.

(21) Appl. No.: 12/175,148

(22) Filed: Jul. 17, 2008

(65) Prior Publication Data

US 2009/0053349 A1     Feb. 26, 2009

(30) Foreign Application Priority Data

Aug. 22, 2007 (JP) ................. 2007-216351

(51) Int. Cl.
B29C 45/77 (2006.01)
(52) U.S. Cl. ..................... 425/145; 425/149
(58) Field of Classification Search ............ 425/145, 425/149
See application file for complete search history.

(56) References Cited

U.S. PATENT DOCUMENTS

| | | | |
|---|---|---|---|
| 4,826,640 A | * | 5/1989 | Neko ............ 264/40.3 |
| 5,792,395 A | | 8/1998 | Ito et al. |
| 6,365,075 B1 | * | 4/2002 | Kamiguchi et al. ...... 264/40.3 |
| 2009/0057938 A1 | * | 3/2009 | Zhang ................ 264/40.1 |

FOREIGN PATENT DOCUMENTS

| | | |
|---|---|---|
| DE | 19619730 A1 | 11/1996 |
| JP | 61248717 A | 11/1986 |
| JP | 06-297532 | 10/1994 |
| JP | 07-032430 | 2/1995 |
| JP | 61019328 A | 11/1996 |
| JP | 09-174637 | 7/1997 |
| JP | 2006289824 A | 10/2006 |

OTHER PUBLICATIONS

European Search Report for 08104755.7 dated Nov. 12, 2008.

* cited by examiner

*Primary Examiner*—Tim Heitbrink
(74) *Attorney, Agent, or Firm*—Lowe Hauptman Ham & Berner, LLP

(57) ABSTRACT

Screw rotation speeds and screw rotating torques are measured at predetermined time intervals during metering and substituted into a previously-assumed function to determine a maximum screw rotating torque at each screw rotation speed. An allowable upper limit of screw rotating torque is set for each screw rotation speed on the basis of the determined maximum screw rotating torque. If a screw rotating torque exceeding the allowable upper limit is detected during metering after the allowable upper limit is set, the screw rotation is stopped or changed.

9 Claims, 16 Drawing Sheets

× ... DATA DA{R(a, n), T(a, n)} STORED IN TABLE TA
• NUMBER OF MOLDING CYCLES FOR SETTING AN INITIALLY ALLOWABLE
UPPER LIMIT OF SCREW ROTATING TORQUE IS 5(a=1,2,3,4,5).
• NUMBER OF MOLDING CYCLES FOR SETTING ALLOWABLE UPPER LIMIT
OF SCREW ROTATING TORQUE IS 6 OR MORE (a≧6)

INJECTION MOLDING MACHINE HAVING FUNCTION FOR MONITORING SCREW ROTATING TORQUES

RELATED APPLICATIONS

The present application is based on, and claims priority from, Japanese Application Number 2007-216351, filed Aug. 22, 2007, the disclosure of which is hereby incorporated by reference herein in its entirety.

BACKGROUND OF THE INVENTION

1. Field of the Invention

The present invention relates to an injection molding machine including a controller having a function for preventing damages to the screw by monitoring and controlling screw rotating torques.

2. Description of the Related Art

A known injection molding machine has a function for protecting a screw by limiting or stopping screw operation immediately after an excessive screw rotating torque exceeding a preset allowable upper limit of screw rotating torque is sensed.

The allowable upper limit of screw rotating torque to be set is determined by calculating the dynamic strength such as tensile strength and torsional fatigue strength of the screw material, or by actually measuring torques in a test in which metering is tentatively performed under conditions in which the screw rotating torque is sufficiently limited.

However, there are cases in which screws break below their respective allowable upper limits of screw rotating torque, so there is a need for an improved injection molding machine that enables an allowable upper limit of screw rotating torque to be set more properly. Since the amount of torque that breaks the screw is far greater than the torque normally used for molding, the screw rotation speed should be limited by a torque closer to the level actually used for molding. If the screw rotation speed is not limited when the screw rotating torque abnormally increases due to any cause, the screw will be subject to a heavy load up to the allowable upper limit.

In a known method, as disclosed in Japanese Patent Application Laid-Open No. 7-32430, screw breakage is prevented by setting an allowable upper limit of screw rotating torque. In a known method for setting an allowable upper limit of screw rotating torque, the dynamic strength of the material is calculated to determine the allowable upper limit. For precise calculation, however, it is required to collect many data of the strength of the screw material such as tensile strength and torsional fatigue strength. In addition, the screw is used in high temperature environment and the number of continuous molding cycles for production exceeds the number of continuous molding cycles for a normal fatigue test. Furthermore, screws widely vary in shape. Accordingly, it is difficult to determine precisely the strength of a screw simply by calculating the dynamic strength of the material.

In another known method for setting an allowable upper limit of screw rotating torque, a reference screw rotating torque required for metering operations is determined from the values actually measured during tentative metering operations and an allowable upper limit of screw rotating torque that will not adversely affect molding is set. If not automated, however, this method is time-consuming because metering conditions vary with resin types and the articles to be molded.

In another known method, as disclosed in Japanese Patent Application Laid-Open No. 6-297532, a discriminating section and a tolerable range are set depending on the distance the screw moves and the time elapsed from the start of metering, and a driving torque of the screw rotating motor in the discriminating section is detected and compared with the tolerable range to detect abnormal metering. This technique requires an operator to determine and manually input the tolerable range of driving torque of the screw rotating motor. It is difficult to determine the tolerable range, which widely varies with molds and resin types. Even if automatically set, this tolerable range is only used to monitor the driving torque of the screw rotating motor and determine the quality of the molded articles, not for preventing screw breakage.

As disclosed in Japanese Patent Application Laid-Open No. 9-174637, there is a known function that sets a limit torque value of the electric servomotor for continuous molding operation on the basis of the actually measured torques with which good kneading and plasticization of the resin are accomplished in trial shots. The limit torque is set with a sufficient margin for the trial shots and the torques of the electric servomotor are actually measured during the trial shots. Here, the torques actually measured along the distance the screw moves in the entire metering process are plotted, but it is not necessary to plot all the actually measured torques to set a limit torque value. Only essential data should be selected for measurement and stored to reduce storage capacity demand.

SUMMARY OF THE INVENTION

An object of the present invention is to provide an injection molding machine capable of measuring and storing screw rotating torques during metering in continuous molding operations and setting allowable upper limits of screw rotating torque, thereby eliminating the need of complex calculation of the dynamic strength of the material or testing for actually measuring screw rotating torques for setting the allowable upper limit of screw rotating torque.

Another object of the present invention is to provide an injection molding machine that enables the screw rotating torque to be properly monitored by setting an allowable upper limit of screw rotating torque for each metering state depending on the rotational speed of the screw, the distance the screw has moved, and the elapsed time.

In a first embodiment of the present invention, an injection molding machine having a function for monitoring screw rotating torques comprises: measuring means for measuring screw rotation speeds and screw rotating torques at predetermined time or distance intervals during metering; storage means for storing the screw rotation speed and screw rotating torque measured by the measuring means; maximum screw rotating torque determining means for determining a maximum screw rotating torque by substituting the screw rotation speeds and screw rotating torques stored in the storage means into a previously-assumed function; allowable upper limit setting means for setting an allowable upper limit of screw rotating torque on the basis of the maximum screw rotating torque determined by the maximum screw rotating torque determining means; and screw rotation stopping/changing means for stopping or changing the screw rotating operation when a screw rotating torque exceeding the allowable upper limit during metering is sensed after the allowable upper limit is set.

In a second embodiment of the present invention, an injection molding machine having a function for monitoring screw rotating torques comprises: measuring means for measuring screw rotation speeds and screw rotating torques at predetermined time or distance intervals during metering; storage means for storing the screw rotation speeds and screw rotating torques measured by the measuring means; maximum screw rotating torque determining means for determining a maximum screw rotating torque by substituting the screw rotation speeds and screw rotating torques stored in the storage means into a previously-assumed function; allowable upper limit setting means for setting an allowable upper limit of screw rotating torque on the basis of the maximum screw rotating torque determined by the maximum screw rotating torque determining means; and driving torque limiting means for limiting the driving torque applied to the screw to the allowable upper limit of screw rotating torque set by the allowable upper limit setting means.

In a third embodiment of the present invention, an injection molding machine having a function for monitoring screw rotating torques comprises: measuring means for measuring screw rotation speeds and screw rotating torques at predetermined time or distance intervals during metering; storage means for storing the screw rotation speeds and screw rotating torques measured by the measuring means for a predetermined number of molding cycles; approximate expression determining means for determining an approximate expression representing a relationship between a specific screw rotation speed and the maximum screw rotating torque at the specific screw rotation speed by substituting the screw rotation speeds and screw rotating torques stored in the storage means into a previously-assumed function; allowable upper limit setting means for setting an allowable upper limit of screw rotating torque by substituting the screw rotating torques to the approximate expression determined by the approximate expression determining means; and screw rotation stopping/changing means for stopping or changing the screw rotating operation when a screw rotating torque exceeding the allowable upper limit is detected during metering after the allowable upper limit is set.

In a fourth embodiment of the present invention, an injection molding machine having a function for monitoring screw rotating torques comprises: measuring means for measuring screw rotation speeds and screw rotating torques at predetermined time or distance intervals during metering; storage means for storing the screw rotation speeds and screw rotating torques measured by the measuring means for a predetermined number of molding cycles; approximate expression determining means for determining an approximate expression representing a relationship between a specific screw rotation speed and the maximum screw rotating torque at the specific screw rotation speed by substituting the screw rotation speeds and screw rotating torques stored in the storage means into a previously-assumed function; allowable upper limit setting means for setting an allowable upper limit of screw rotating torque by substituting the screw rotating torques to the approximate expression determined by the approximate expression determining means; and driving torque limiting means for limiting the driving torque applied to the screw to the allowable upper limit set by the allowable upper limit setting means.

The injection molding machine in any one of the first to fourth embodiments may further include the following technical features:

The injection molding machine may further include updating means for updating the upper limit of screw rotating torque on the basis of the screw rotation speeds and screw rotating torques measured at predetermined time or distance intervals during metering after the allowable upper limit of screw rotating torque is set.

The upper limit of screw rotating torque may be set for each of the forward and backward directions in which the screw rotates.

The injection molding machine may further include storage means for storing the allowable upper limit of screw rotating torque set by the allowable upper limit setting means, in association with mold information.

The injection molding machine may further include function selecting means for selecting a function from a plurality of previously-assumed functions that are prepared.

The allowable upper limit of screw rotating torque may be set by adding a certain value to the maximum screw rotating torque or by multiplying the maximum screw rotating torque by a certain coefficient.

With the above arrangement, the injection molding machine of the present invention can repeatedly measure and store screw rotating torques during metering and set allowable upper limits of screw rotating torque in continuous molding operations, without the need of complex calculation of the dynamic strength of the material or testing for actually measuring screw rotating torques.

The allowable upper limit of screw rotating torque can be updated each time the preset number of molding cycles is completed during continuous molding operations. The allowable upper limits of screw rotating torque, which are set on the basis of the data obtained from actual molding operations, are below any amount of torque that breaks the screw and useful to limit the screw rotation before a heavy load is applied to the screw.

Furthermore, only the data required for setting allowable upper limits of screw rotating torque is measured and stored, so storage capacity demand is limited.

BRIEF DESCRIPTION OF THE DRAWINGS

The above and other objects and features of the present invention will become apparent from the following description of embodiments with reference to the accompanying drawings, in which.

DETAILED DESCRIPTION OF THE PREFERRED EMBODIMENTS

Figure 1A:
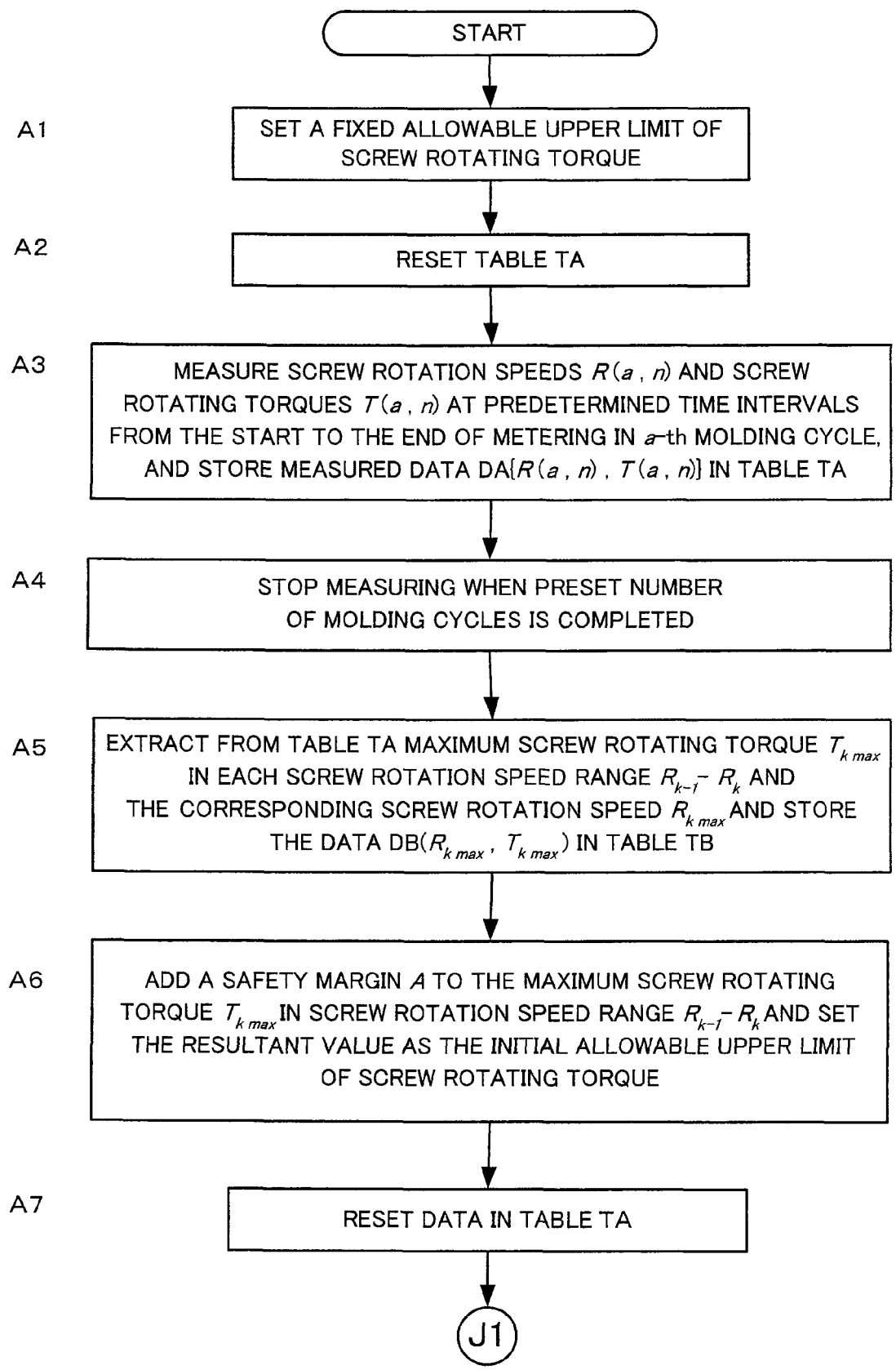
FIG. 1A is a flowchart illustrating a processing algorithm for setting allowable upper limits of screw rotating torque in a first embodiment of the present invention.

First, an injection molding machine in a first embodiment of the present invention will be described.

Before setting an allowable upper limit of screw rotating torque, a fixed allowable upper limit of screw rotating torque common to all the molding cycles is set. This common allowable upper limit is set to a value with a sufficient margin. Under conditions in which screw operation is limited by the common (and fixed) allowable upper limit of screw rotating torque, the allowable upper limit of screw rotating torque is set.

Next, measurement is initiated to set an initial allowable upper limit of screw rotating torque. Here, the term "initial allowable upper limit of screw rotating torque" refers to the allowable upper limit of screw rotating torque that is set on the basis of the data obtained by repeatedly measuring screw rotating torques Tn at initial screw rotation speeds Rn for the preset number of molding cycles starting immediately after the actual molding is initiated.

The initial allowable upper limit of screw rotating torque is set on the basis of the data obtained during a limited number of molding cycles, although data from more molding cycles is required to precisely set the allowable upper limit of screw rotating torque. The initial allowable upper limit of screw rotating torque determined from the torque values obtained in the actual molding cycles is a value below the fixed allowable upper limit of screw rotating torque common to all the molding cycles, so it is useful to limit the torque before a higher rotating torque is applied to the screw.

An example of setting the initial allowable upper limit of screw rotating torque is described below. In this example, the initial allowable upper limit of screw rotating torque is set on the basis of the data measured during initial five molding cycles from the start of molding.

First, screw rotation speeds R(a,n) and screw rotating torques T(a,n) are measured at preset time intervals (time $t_0$, $t_1$, ... $t_n$, ...) from the start to the end of metering in a-th molding cycle (a=1, 2, ... 5) and the measured data DA {R(a,n), T(a,n)} is stored in a table TA (TABLE 1). This measuring and storing process is initiated in the first molding cycle (a=1).

Once the fifth molding cycle is completed, the maximum screw rotating torque $T_{k\ max}$ in a preset screw rotation speed range $R_{k-1}$-$R_k$ and the corresponding screw rotation speed $R_{k\ max}$ are extracted from the group of measured data in table TA (TABLE 1) and the extracted data DB ($R_{k\ max}$, $T_{k\ max}$) is stored in a table TB (TABLE 2). A safety margin A is added to the maximum screw rotating torque $T_{k\ max}$ stored in the table TB (TABLE 2) to set the initial allowable upper limit of screw rotating torque $T_{k\ max}$+A for the screw rotation speed range $R_{k-1}$-$R_k$.

As described above, the initial allowable upper limit of screw rotating torque determined from the actual molding torque values, despite the limited number of data, is below the common (and fixed) allowable upper limit of screw rotating torque and is sufficiently effective for preventing breakage of the screw.

To set more precisely an allowable upper limit of screw rotating torque, measurement is performed as follows. The number of molding cycles to be set is increased to collect more amount of data and screw rotating torques Tn are measured at screw rotation speeds Rn similarly to the above case in which the initial allowable upper limit of screw rotating torque is set on the basis of the data from the five molding cycles.

First, the number of molding cycles to be set is increased to collect more amount of data and the table TA (TABLE 1) is reset. Screw rotation speeds R(a,n) and screw rotating torques T(a,n) are measured at preset time intervals from the start to the end of metering and the measured data DA {R(a,n), T(a,n)} is stored in the table TA (TABLE 1). This measurement is repeated until the preset number of molding cycles is completed.

Once the preset number of molding cycles is completed, the maximum screw rotating torque $T_{k\ max}$ in each screw rotation speed range $R_{k-1}$-$R_k$ and the corresponding screw rotation speed $R_{k\ max}$ are extracted from the group of measured data in the table TA (TABLE 1) and the extracted data DC ($R_{k\ max}$, $T_{k\ max}$) is stored in a table TC (TABLE 3).

For each screw rotation speed range $R_{k-1}$-$R_k$, the data DB ($R_{k\ max}$, $T_{k\ max}$) in the table TB (TABLE 2) and the data DC ($R_{k\ max}$, $T_{k\ max}$) in the table TC (TABLE 3) are compared and the smaller data is stored in a table TD (TABLE 4) as data DD ($R_{k\ max}$, $T_{k\ max}$).

A safety margin A is added to the maximum screw rotating torque $T_{k\ max}$ stored in the table TD (TABLE 4) to set an allowable upper limit of screw rotating torque $T_{k\ max}$+A for the screw rotation speed range $R_{k-1}$-$R_k$.

Then, in the actual molding operation, the allowable upper limit of screw rotating torque $T_{k\ max}$+A is set for the screw rotation speed range $R_{k-1}$-$R_k$ and, if a screw rotating torque exceeding this allowable upper limit is detected, the screw rotating operation is stopped or changed so that the screw rotating torque is reduced to a value equal to or below the allowable upper limit.

Next, the data in the table TA (TABLE 1), table TB (TABLE 2), and table TC (TABLE 3) are deleted. Then, the data in the table TD (TABLE 4) is moved to the table TB (TABLE 2) and subsequently the data in the table TD (TABLE 4) is deleted.

The number of molding cycles for setting the allowable screw rotating torque limit is reset, and measurement is initiated again. Until the preset number of molding cycles is completed, the measurement is repeated and the measured data is stored in the table TA (TABLE 1). Once the preset number of molding cycles is completed, the maximum screw rotating torque value $T_{k\ max}$ in each screw rotation speed range $R_{k-1}$-$R_k$ and the screw rotation speed at $T_{k\ max}$ are extracted and the extracted data DC ($R_{k\ max}$, $T_{k\ max}$) is stored in the table TC (TABLE 3).

Subsequently, as long as injection molding continues, the measurement is repeated and the allowable upper limit of screw rotating torque is repeatedly updated.

Instead of adding the safety margin A to the $T_{k\ max}$, the $T_{k\ max}$ may be multiplied by a safety coefficient B to obtain an allowable upper limit of screw rotating torque as $B \times T_{k\ max}$. When a higher allowable upper limit of screw rotating torque is desired, either the data DB ($R_{k\ max}$, $T_{k\ max}$) in the table TB (TABLE 2) or the data DC ($R_{k\ max}$, $T_{k\ max}$) in the table TC (TABLE 3), whichever is higher, may be stored in the table TD (TABLE 4) as the data DD ($R_{k\ max}$, $T_{k\ max}$). Whether the higher or smaller value is selected, the margin A or safety coefficient B provides an allowable upper limit of screw rotating torque that will avoid problems in actual injection molding operations.

Figure 1B:
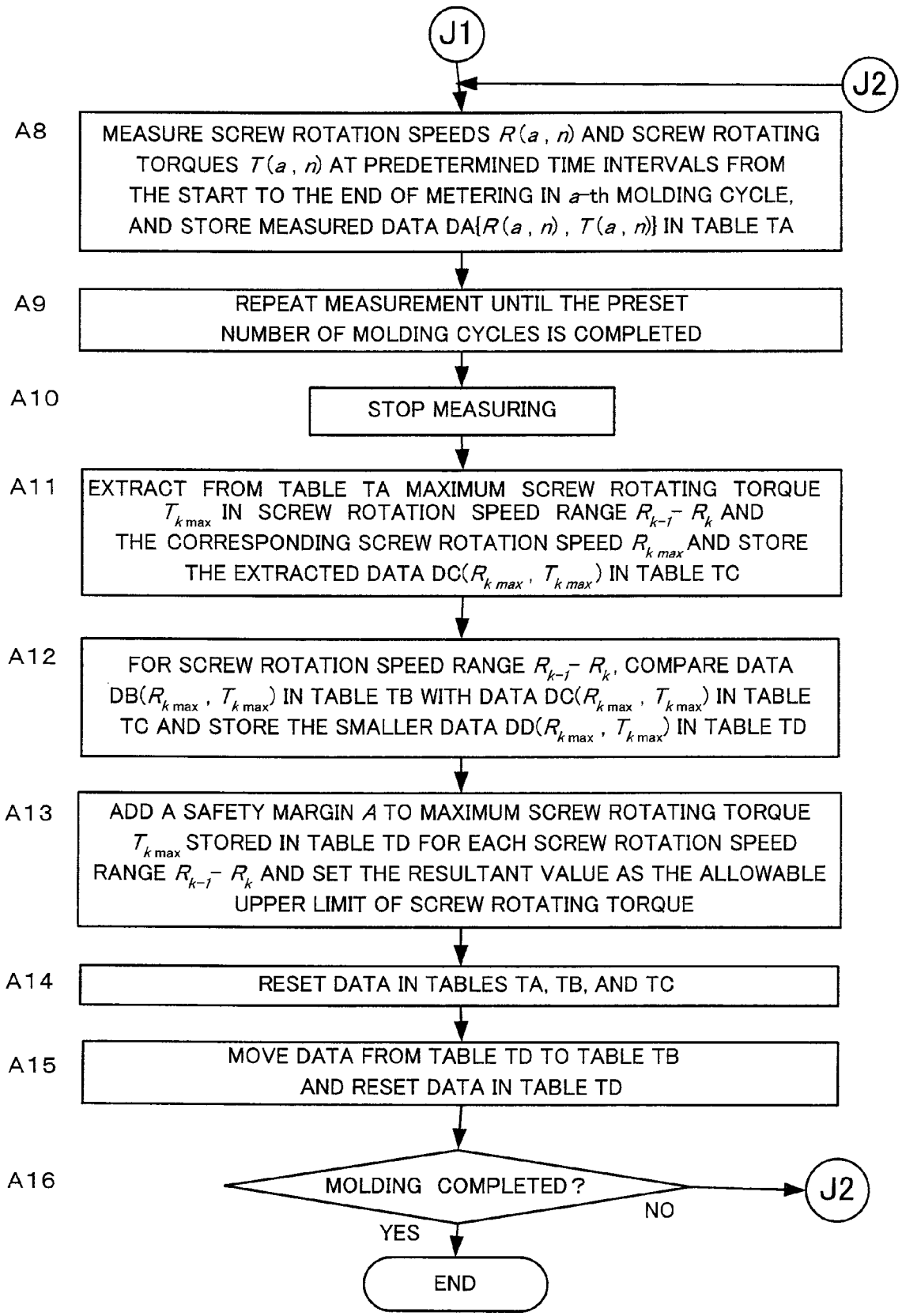
FIG. 1B is a flowchart continued from the flowchart in FIG. 1A.

FIGS. 1A and 1B show a flowchart illustrating a processing algorithm for setting an allowable upper limit of screw rotating torque in the above first embodiment of the present invention. This flowchart will be described below step by step.

Step A1: Sets a fixed allowable upper limit of screw rotating torque.

Step A2: Resets the table TA (TABLE 1) in which screw rotation speeds and screw rotating torques are stored at predetermined time intervals from the start to the end of metering.

Step A3: Measures screw rotation speeds R(a,n) and screw rotating torques T(a,n) at preset time intervals ($t_0$, $t_1$, ..., $t_n$, ...) from the start to the end of metering in a-th molding cycle (a=1, 2, ...) and stores the measured data DA {R(a,n), T(a,n)} in the table TA (TABLE 1).

Step A4: Stops measuring when the preset number of molding cycles is completed.

TABLE 1

TABLE TA

|  | 1 | 2 | ... | a | ... | i |
|---|---|---|---|---|---|---|
| $t_0$ | DA{R(1, 0), T(1, 0)} | DA{R(2, 0), T(2, 0)} | ... | DA{R(a, 0), T(a, 0)} | ... | DA{R(i, 0), T(i, 0)} |
| $t_1$ | DA{R(1, 1), T(1, 1)} | DA{R(2, 1), T(2, 1)} | ... | DA{R(a, 1), T(a, 1)} | ... | DA{R(i, 1), T(i, 1)} |
| $t_2$ | DA{R(1, 2), T(1, 2)} | DA{R(2, 2), T(2, 2)} | ... | DA{R(a, 2), T(a, 2)} | ... | DA{R(i, 2), T(i, 2)} |
| — | — | — | ... | — | ... | — |
| $t_n$ | DA{R(1, n), T(1, n)} | DA{R(2, n), T(2, n)} | ... | DA{R(a, n), T(a, n)} | ... | DA{R(i, n), T(i, n)} |
| — | — | — | ... | — | ... | — |
| $t_j$ | DA{R(1, j), T(1, j)} | DA{R(2, j), T(2, j)} | ... | DA{R(a, j), T(a, j)} | ... | DA{R(i, j), T(i, j)} |

TABLE 2

TABLE TB

| $R_0$-$R_1$ | DB($R_{1\ max}$, $T_{1\ max}$) |
|---|---|
| $R_1$-$R_2$ | DB($R_{2\ max}$, $T_{2\ max}$) |
| $R_2$-$R_3$ | DB($R_{3\ max}$, $T_{3\ max}$) |
| — | — |
| $R_{k-1}$-$R_k$ | DB($R_{k\ max}$, $T_{k\ max}$) |
| — | — |
| $R_{j-1}$-$R_j$ | DB($R_{j\ max}$, $T_{j\ max}$) |

TABLE 3

TABLE TC

| $R_0$-$R_1$ | DC($R_{1\ max}$, $T_{1\ max}$) |
|---|---|
| $R_1$-$R_2$ | DC($R_{2\ max}$, $T_{2\ max}$) |
| $R_2$-$R_3$ | DC($R_{3\ max}$, $T_{3\ max}$) |
| — | — |
| $R_{k-1}$-$R_k$ | DC($R_{k\ max}$, $T_{k\ max}$) |
| — | — |
| $R_{j-1}$-$R_j$ | DC($R_{j\ max}$, $T_{j\ max}$) |

TABLE 4

TABLE TD

| $R_0$-$R_1$ | DD($R_{1\ max}$, $T_{1\ max}$) |
|---|---|
| $R_1$-$R_2$ | DD($R_{2\ max}$, $T_{2\ max}$) |
| $R_2$-$R_3$ | DD($R_{3\ max}$, $T_{3\ max}$) |
| — | — |
| $R_{k-1}$-$R_k$ | DD($R_{k\ max}$, $T_{k\ max}$) |
| — | — |
| $R_{j-1}$-$R_j$ | DD($R_{j\ max}$, $T_{j\ max}$) |

Step A5: Extracts the maximum screw rotating torque $T_{k\ max}$ in each screw rotation speed range $R_{k-1}$-$R_k$ and the corresponding screw rotation speed $R_{k\ max}$ from the table TA (TABLE 1) and stores the extracted data DB ($R_{k\ max}$, $T_{k\ max}$) in the table TB (TABLE 2).

Step A6: Adds a safety margin A to the maximum screw rotating torque $T_{k\ max}$ in each screw rotation speed range $R_{k-1}$-$R_k$ and sets the resultant value as the initial allowable upper limit of screw rotating torque.

Step A7: Resets the data in the table TA (TABLE 1).

Step A8: Measures screw rotation speeds R(a,n) and screw rotating torques T(a,n) at preset time intervals from the start to the end of metering in a-th molding cycle and stores the measured data DA {R(a,n), T(a,n)} in the table TA (TABLE 1).

Step A9: Repeats the measurement until the preset number of molding cycles is completed.

Step A10: Stops measuring.

Step A11: Extracts the maximum screw rotating torque value $T_{k\ max}$ in each screw rotation speed range $R_{k-1}$-$R_k$ and the corresponding screw rotation speed $R_{k\ max}$ from the table TA (TABLE 1) and stores the extracted data DC ($R_{k\ max}$, $T_{k\ max}$) in the table TC (TABLE 3).

Step A12: For each screw rotation speed range $R_{k-1}$-$R_k$, compares the data DB ($R_{k\ max}$, $T_{k\ max}$) in table TB (TABLE 2) and the data DC ($R_{k\ max}$, $T_{k\ max}$) in table TC (TABLE 3) and stores the smaller data in the table TD (TABLE 4) as the data DD ($R_{k\ max}$, $T_{k\ max}$).

Step A13: Adds a safety margin A to the maximum screw rotating torque $T_{k\ max}$ in each screw rotation speed range $R_{k-1}$-$R_k$ stored in the table TD (TABLE 4) and sets the resultant value as the allowable upper limit of screw rotating torque.

Step A14: Resets the data in the table TA (TABLE 1), table TB (TABLE 2), and table TC (TABLE 3).

Step A15: Moves the data from the table TD (TABLE 4) to the table TB (TABLE 2) and resets the data in the table TD.

Step A16: Checks whether the preset number of molding cycles is completed; if not, returns to Step A8 (after processing of "a=a+1"). If completed, the processing ends.

Figure 2:
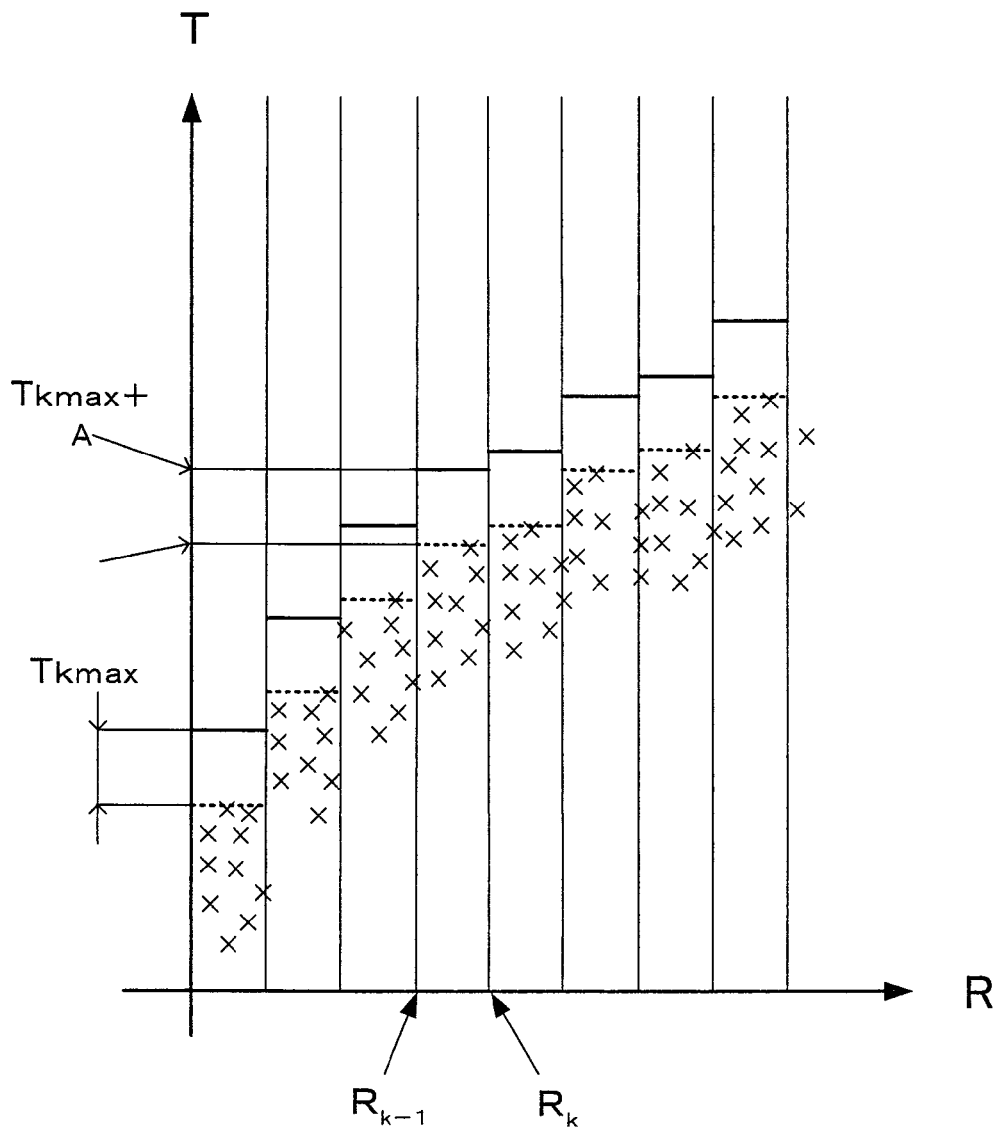
FIG. 2 is a graph showing a relationship between screw rotation speeds and screw rotating torques, as well as allowable upper limits of screw rotating torque to be set.

FIG. 2 is a graph showing the relationship between screw rotation speeds and screw rotating torques, as well as the allowable upper limits of screw rotating torque that are set. In this graph, the screw rotation speed R is indicated on the horizontal axis and the amount of screw rotating torque T is indicated on the vertical axis. In FIG. 2, the screw rotation speeds R(a,n) and screw rotating torques T(a,n) recorded in the table TA (TABLE 1) in each molding cycle are plotted for the screw rotation speed ranges $R_1$-$R_2$, $R_2$-$R_3$, ..., $R_{k-1}$-$R_k$, ....

Next, an injection molding machine in a second embodiment of the present invention will be described.

Before setting an allowable upper limit of screw rotating torque of the present invention, a fixed allowable upper limit of screw rotating torque common to all the molding cycles is set, in addition to the above allowable upper limit of screw rotating torque of the present invention. This common allowable upper limit is set to a value with a sufficient margin. The allowable upper limit of screw rotating torque according to the present invention is set under conditions in which screw operation is limited by the common (and fixed) allowable upper limit of screw rotating torque.

First, measurement is initiated to set an initial allowable upper limit of screw rotating torque. The term "initial allowable upper limit of screw rotating torque" refers to the allowable upper limit of screw rotating torque that is set on the basis of the data obtained by repeatedly measuring screw rotating torques Tn at screw rotation speeds Rn for the preset number of molding cycles starting immediately after actual molding is initiated.

The initial allowable upper limit of screw rotating torque is set on the basis of the data obtained during a limited number of molding cycles, although data from more molding cycles is required to precisely set the allowable upper limit of screw rotating torque. The initial allowable upper limit of screw rotating torque determined from the torque values obtained in the actual molding cycles is a value below the common (and fixed) allowable upper limit of screw rotating torque and useful to limit the torque before a higher torque is applied to the screw.

An example of setting an initial allowable upper limit of screw rotating torque is described below. In this example, the initial allowable upper limit of screw rotating torque is set from the data obtained in the initial five molding cycles. Screw rotation speeds R(a,n) and screw rotating torque T(a,n) are measured at preset time intervals (time $t_0, t_1, ..., t_n, ...$) from the start to the end of metering in a-th molding cycle (a=1, 2, ... 5) and the measured data DA {R(a,n), T(a,n)} is stored in a table TA (TABLE 5). This measuring and storing process is initiated in the first molding cycle (a=1) and repeated until the fifth molding cycle is completed.

Once the fifth molding cycle is completed, the maximum screw rotating torque value $T_{k\,max}$ in the preset screw rotation speed range $R_{k-1}$-$R_k$ and the corresponding screw rotation speed $R_{k\,max}$ are extracted from the group of measured data in table TA (TABLE 5) and the extracted data DB ($R_{k\,max}$, $T_{k\,max}$) is stored in a table TB (TABLE 6).

An approximate expression F(R) representing the relationship between the screw rotation speed $R_{k\,max}$ and the maximum screw rotating torque $T_{k\,max}$ is determined from the above data. With many types of resin, the screw rotating torque in injection molding tends to increase as the screw rotation speed increases, so it is suitable to apply the approximate expression F(R) to a monotonously increasing function. Suitable functions include a linear expression (mathematical expression 1), quadratic expression (mathematical expression 2) to n-dimensional polynomial (mathematical expression 3), and an irrational function (mathematical expression 4). With some types of resins, the screw rotating torque does not tend to increase with the increase in screw rotation speed, in which case an n-dimensional polynomial (mathematical expression 3) is applied to the approximate expression F(R). To select a suitable function, an optimal order n is experimentally determined from actual molding operations, taking into account the computational capacity of the injection molding machne.

$$F(R)=aR+b \tag{1}$$

$$F(R)=aR^2+bR+c \tag{2}$$

$$F(R)=a_0+a_1R+a_2R^2+\ldots+a_1R^1+\ldots+a_nR^n \tag{3}$$

$$F(R)=aR^q+b \tag{4}$$

Here, an expression of irrational function R (mathematical expression 4) is used as an approximate function. First, assuming that q=½ and the number of data is m, the coefficient a and the value of b in the mathematical expression 4 are determined using the least-squares method. The resultant approximate expression is the following mathematical expression 5:

$$F(R)=a\sqrt{R}+b \tag{5}$$

In this case, the residual sum of squares is:

$$S_e = \sum_{i=1}^{m} r^2 = \sum_{i=1}^{m} [F(R_i) - (a\sqrt{R_i} + b)]^2 \tag{6}$$

Next, the values of a and b that minimize Se are determined. Assuming that Se is a function of (a, b), Se is applied to a partial differential with a and b, which results in 0. Then, the following simultaneous equations are obtained.

$$\frac{\partial S_e}{\partial a} = 2\left(\sum_{i=1}^{m} R_i\right)a - 2\left(\sum_{i=1}^{m} F(R_i)\sqrt{R_i}\right) + 2\left(\sum_{i=1}^{m} \sqrt{R_i}\right)b = 0 \tag{7}$$

$$\frac{\partial S_e}{\partial b} = 2mb - 2\left(\sum_{i=1}^{m} F(R_i)\right) + 2\left(\sum_{i=1}^{m} \sqrt{R_i}\right)a = 0$$

The simultaneous equations are solved, resulting in a and b being as follows:

$$a = \frac{m\sum_{i=1}^{m} F(R_i)\sqrt{R_i} - \sum_{i=1}^{m} F(R_i) \sum_{i=1}^{m} \sqrt{R_i}}{m\sum_{i=1}^{m} R_i - \left(\sum_{i=1}^{m} \sqrt{R_i}\right)^2} \quad (8)$$

$$b = \frac{\sum_{i=1}^{m} R_i \sum_{i=1}^{m} F(R_i) - \sum_{i=1}^{m} F(R_i)\sqrt{R_i} \sum_{i=1}^{m} \sqrt{R_i}}{m\sum_{i=1}^{m} R_i - \left(\sum_{i=1}^{m} \sqrt{R_i}\right)^2}$$

$F(R)=a\sqrt{R}+b$ (mathematical expression 5) being an approximate expression, all the actually measured screw rotating torque values T do not necessarily satisfy $T<F(R)<a\sqrt{R}+b$.

Accordingly, a ratio $\rho$ of the maximum screw rotating torque value $T_{k\,max}$ stored in the table TB (TABLE 6) to the screw rotating torque value obtained by the approximate expression is determined. This maximum value $\rho_{max}$ is multiplied by F(R). Namely, $F(R)=\rho_{max}(a\sqrt{R}+b)$ represents an envelope curve including the maximum values of the data group in the table TA (TABLE 5). Furthermore, a safety margin A is added and the resultant value is set as the initial allowable upper limit of screw rotating torque $T_{max}$.

$$1 \leq \rho = \frac{T_{kmax}}{f(R_{kmax})} \quad (9)$$

$$T_{max} = \rho_{max}(a\sqrt{R}+b) + A \quad (10)$$

As described above, the initial allowable upper limit of screw rotating torque determined from the screw rotating torques during actual molding, despite the limited number of data, is below the common (and fixed) allowable upper limit of screw rotating torque and is sufficiently effective for preventing breakage of the screw.

To set more precisely an allowable upper limit of screw rotating torque, measurement is performed as follows. The number of molding cycles to be preset is increased to collect more amount of data and screw rotating torques Tn at screw rotation speeds Rn are measured, similarly to the above case in which the initial allowable upper limit of screw rotating torque is set on the basis of five molding cycles.

First, the number of molding cycles to be set in advance is increased so as to increase the amount of date to be collected. And then, the table TA (TABLE 5) is reset to collect more amount of data by increasing the number of molding cycles to be preset. Screw rotation speeds R(a,n) and screw rotating torques T(a,n) are measured at preset time intervals from the start to the end of metering and the measured data DA {R(a, n), T(a,n)} is stored in the table TA (TABLE 5). This measurement is repeated until the preset number of molding cycles is completed.

Once the preset number of molding cycles is completed, the maximum screw rotating torque $T_{k\,max}$ in each screw rotation speed range $R_{k-1}$-$R_k$ and the corresponding screw rotation speed $R_{k\,max}$ are extracted from the table TA (TABLE 5) in which the measured data is stored and the extracted data DC ($R_{k\,max}$, $T_{k\,max}$) is stored in a table TC (TABLE 7).

For each screw rotation speed range $R_{k-1}$-$R_k$, the data DB ($R_{k\,max}$, $T_{k\,max}$) in the table TB (TABLE 6) and the data DC ($R_{k\,max}$, $T_{k\,max}$) in the table TC (TABLE 7) are compared and the smaller data is stored in a table TD (TABLE 8) as data DD ($R_{k\,max}$, $T_{k\,max}$).

An approximate expression F(R) representing the relationship between the screw rotation speed $R_{k\,max}$ and the maximum screw rotating torque $T_{k\,max}$ is determined from the data in table TD (TABLE 8). This approximate expression is determined as described above.

Ratios $\rho$ of the data DD ($R_{k\,max}$, $T_{k\,max}$) stored in the table TD (TABLE 8) to the screw rotating torque determined by the approximate expression is calculated. The maximum value $\rho_{max}$ of the ratios $\rho$ is determined and multiplied by F(R). Then, a safety margin A is added to the multiplied value and the resultant value including the safety margin A is set as the allowable upper limit of screw rotating torque $T_{max}$ (See FIG. 6).

The allowable upper limit of screw rotating torque for each moment in metering is determined by substituting the screw rotation speed R at each moment of metering into the mathematical expression 10 that provides an allowable upper limit of screw rotating torque $T_{max}$. If a screw rotating torque exceeding this allowable upper limit is detected, the screw rotating operation is stopped or changed so that the screw rotating torque is reduced to a value equal to or below the allowable upper limit. Alternatively, the screw rotation speed R set for metering may be substituted into the mathematical expression 10 that is an approximate expression, to determine an allowable upper limit of screw rotating torque at the set value R. If a screw rotating torque exceeding this allowable upper limit is detected, the screw rotating operation is stopped or changed so that the screw rotating torque is reduced to a value equal to or below the allowable upper limit.

Next, the data in the table TA (TABLE 5), table TB (TABLE 6), and table TC (TABLE 7) are deleted. The data in the table TD (TABLE 8) is moved to the table TB (TABLE 6) and subsequently the data in the table TD is deleted. The number of molding cycles for setting is reset and measurement is initiated again. Until the preset number of molding cycles is completed, the measurement is repeated and the measured data are repeatedly stored in the table TA (TABLE 5). Once the preset number of molding cycles is completed, the maximum screw rotating torque value $T_{k\,max}$ in each screw rotation speed range $R_{k-1}$-$R_k$ and the corresponding screw rotation speed $R_{k\,max}$ are extracted and the extracted data DC ($R_{k\,max}$, $T_{k\,max}$) is stored in the table TC (TABLE 7). Subsequently, as long as molding continues, this measurement is repeated and the allowable upper limit of screw rotating torque is repeatedly updated. Instead of adding a safety margin A, $\rho_{max}(a\sqrt{R}+b)$ may be multiplied by a safety coefficient B to set the upper limit as $T=B\cdot\rho_{max}(a\sqrt{R}+b)$.

When a higher allowable upper limit of screw rotating torque is desired, either the data DB ($R_{k\,max}$, $T_{k\,max}$) in the table TB (TABLE 6) or the data DC ($R_{k\,max}$, $T_{k\,max}$) in the table TC (TABLE 7), whichever is higher, may be stored in the table TD (TABLE 8) as the data DD ($R_{k\,max}$, $T_{k\,max}$).

TABLE 5

TABLE TA

|     | 1 | 2 | ... | a | ... | i |
|-----|---|---|-----|---|-----|---|
| $t_0$ | DA{R(1, 0), T(1, 0)} | DA{R(2, 0), T(2, 0)} | ... | DA{R(a, 0), T(a, 0)} | ... | DA{R(i, 0), T(i, 0)} |
| $t_1$ | DA{R(1, 1), T(1, 1)} | DA{R(2, 1), T(2, 1)} | ... | DA{R(a, 1), T(a, 1)} | ... | DA{R(i, 1), T(i, 1)} |
| $t_2$ | DA{R(1, 2), T(1, 2)} | DA{R(2, 2), T(2, 2)} | ... | DA{R(a, 2), T(a, 2)} | ... | DA{R(i, 2), T(i, 2)} |
| — | — | — | ... | — | ... | — |
| $t_n$ | DA{R(1, n), T(1, n)} | DA{R(2, n), T(2, n)} | ... | DA{R(a, n), T(a, n)} | ... | DA{R(i, n), T(i, n)} |
| — | — | — | ... | — | ... | — |
| $t_j$ | DA{R(1, j), T(1, j)} | DA{R(2, j), T(2, j)} | ... | DA{R(a, j), T(a, j)} | ... | DA{R(i, j), T(i, j)} |

TABLE 6

TABLE TB

| $R_0$-$R_1$ | DB($R_{1\ max}$, $T_{1\ max}$) |
|---|---|
| $R_1$-$R_2$ | DB($R_{2\ max}$, $T_{2\ max}$) |
| $R_2$-$R_3$ | DB($R_{3\ max}$, $T_{3\ max}$) |
| — | — |
| $R_{k-1}$-$R_k$ | DB($R_{k\ max}$, $T_{k\ max}$) |
| — | — |
| $R_{j-1}$-$R_j$ | DB($R_{j\ max}$, $T_{j\ max}$) |

TABLE 7

TABLE TC

| $R_0$-$R_1$ | DC($R_{1\ max}$, $T_{1\ max}$) |
|---|---|
| $R_1$-$R_2$ | DC($R_{2\ max}$, $T_{2\ max}$) |
| $R_2$-$R_3$ | DC($R_{3\ max}$, $T_{3\ max}$) |
| — | — |
| $R_{k-1}$-$R_k$ | DC($R_{k\ max}$, $T_{k\ max}$) |
| — | — |
| $R_{j-1}$-$R_j$ | DC($R_{j\ max}$, $T_{j\ max}$) |

TABLE 8

TABLE TD

| $R_0$-$R_1$ | DD($R_{1\ max}$, $T_{1\ max}$) |
|---|---|
| $R_1$-$R_2$ | DD($R_{2\ max}$, $T_{2\ max}$) |
| $R_2$-$R_3$ | DD($R_{3\ max}$, $T_{3\ max}$) |
| — | — |
| $R_{k-1}$-$R_k$ | DD($R_{k\ max}$, $T_{k\ max}$) |
| — | — |
| $R_{j-1}$-$R_j$ | DD($R_{j\ max}$, $T_{j\ max}$) |

Figure 3:
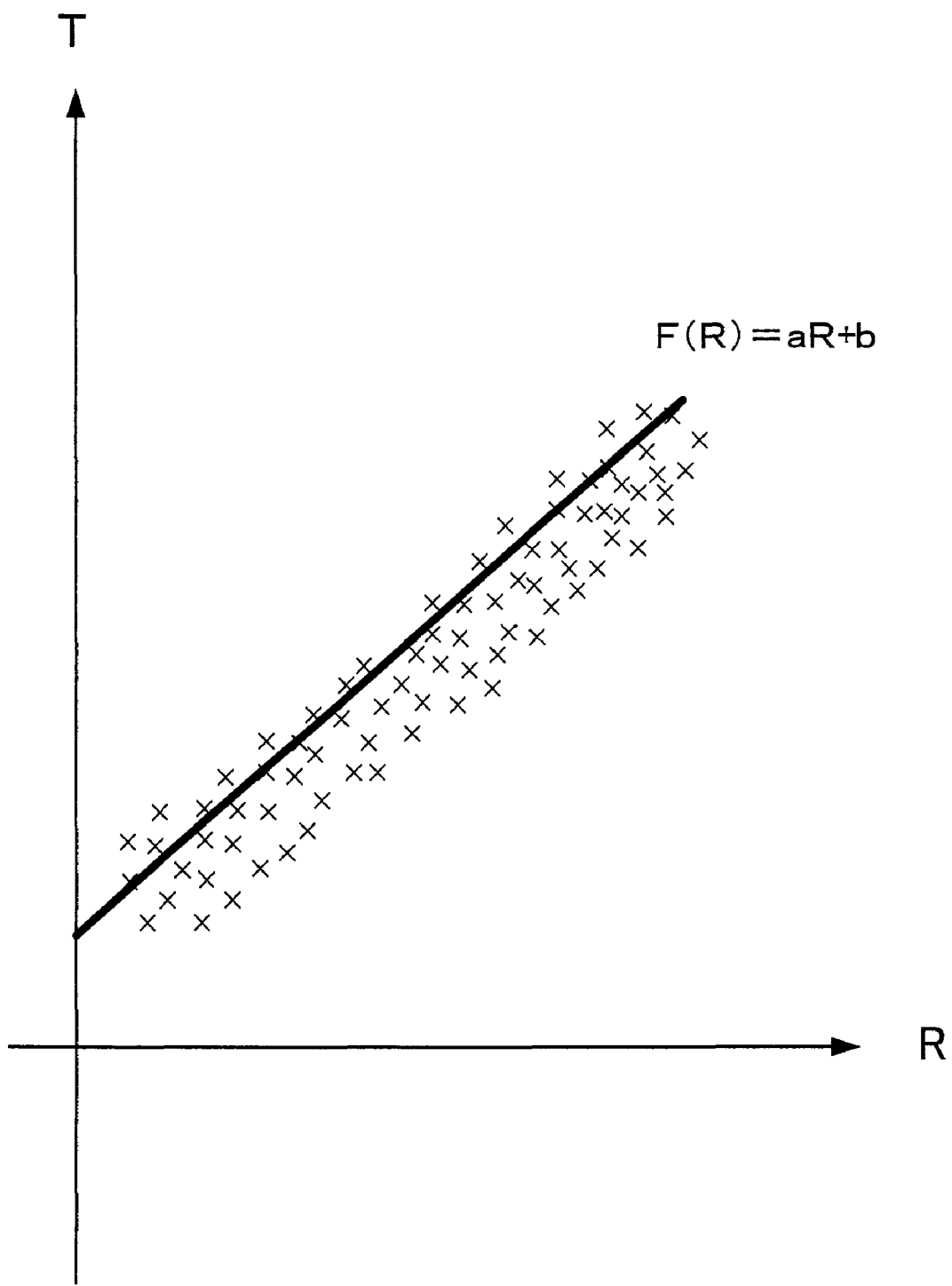
FIG. 3 is a graph showing that the approximate expression representing the relationship between screw rotation speeds $R_{k\ max}$ and maximum screw rotating torques $T_{k\ max}$ is a monotonously increasing linear function.

FIG. 3 is a graph showing that the approximate expression representing the relationship between screw rotation speeds $R_{k\ max}$ and maximum screw rotating torques $T_{k\ max}$ is a monotonously increasing linear function.

Figure 4:
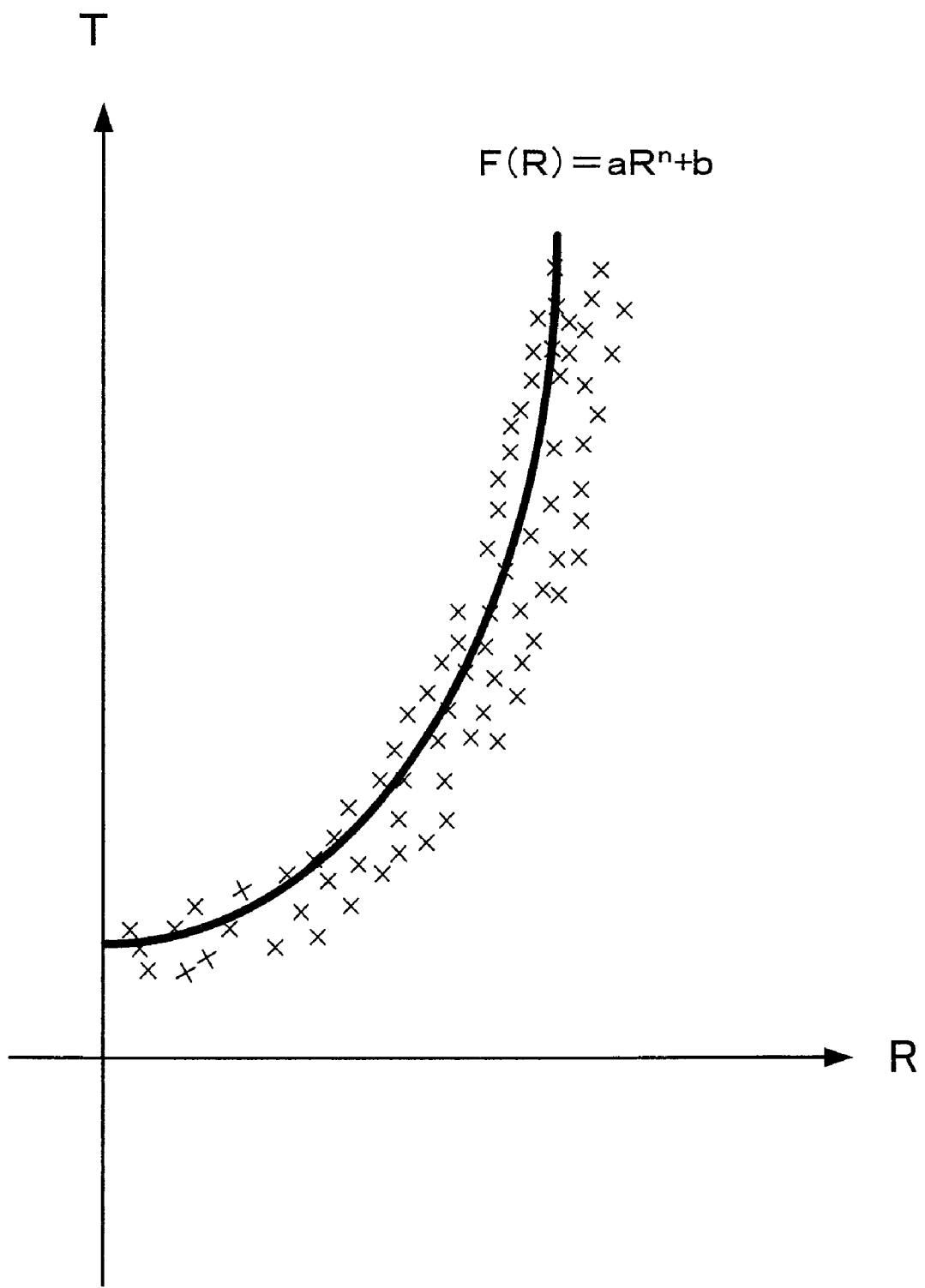
FIG. 4 is a graph showing that the approximate expression representing the relationship between screw rotation speeds $R_{k\ max}$ and maximum screw rotating torques $T_{k\ max}$ is an n-dimensional function (n>1)

FIG. 4 is a graph showing that the approximate expression representing the relationship between screw rotation speeds $R_{k\ max}$ and maximum screw rotating torques $T_{k\ max}$ is an n-dimensional function (n>1) such as a quadratic function.

Figure 5:
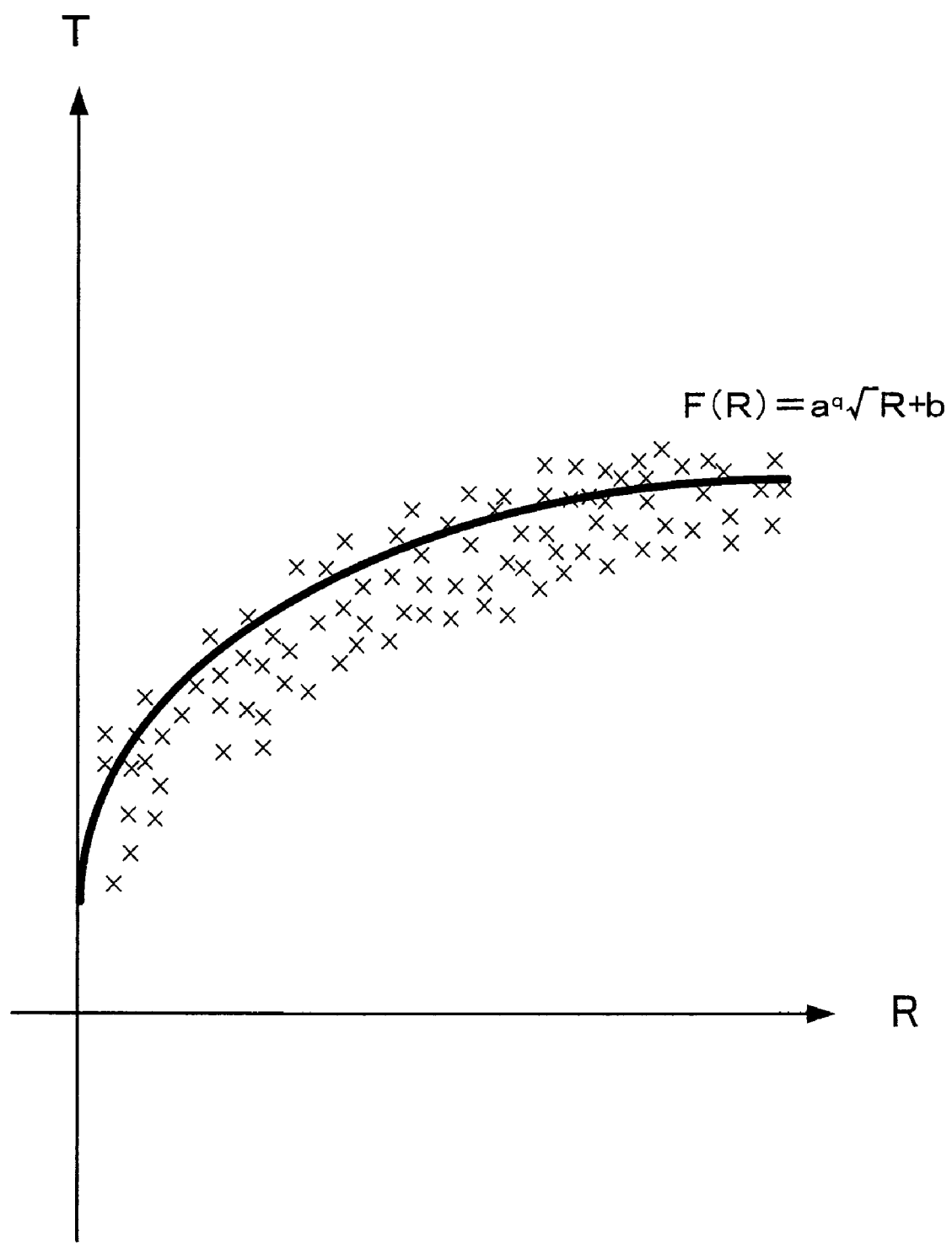
FIG. 5 is a graph showing that the approximate expression representing the relationship between screw rotation speeds $R_{k\ max}$ and maximum screw rotating torques $T_{k\ max}$ is an irrational function.

FIG. 5 is a graph showing that the approximate expression representing the relationship between screw rotation speeds $R_{k\ max}$ and maximum screw rotating torques $T_{k\ max}$ is an irrational function such as a square root function.

Figure 6:
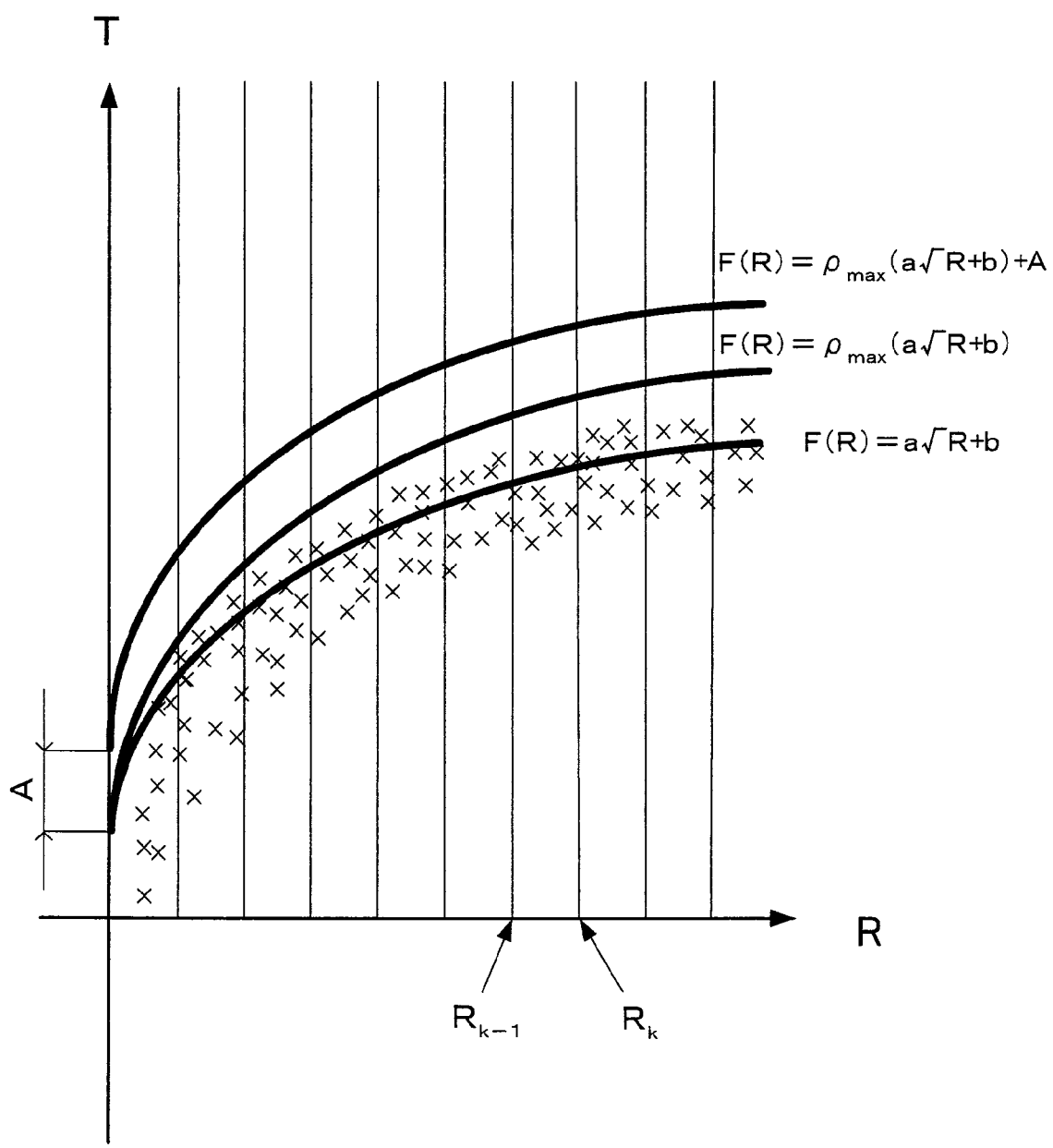
FIG. 6 is a graph showing the relationship between screw rotation speeds and screw rotating torques, as well as the allowable upper limits of screw rotating torque to be set by approximate expressions.

FIG. 6 is a graph showing the relationship between screw rotation speeds and screw rotating torques, as well as the allowable upper limits of screw rotating torque to be set by the approximate expressions.

Figure 7A:
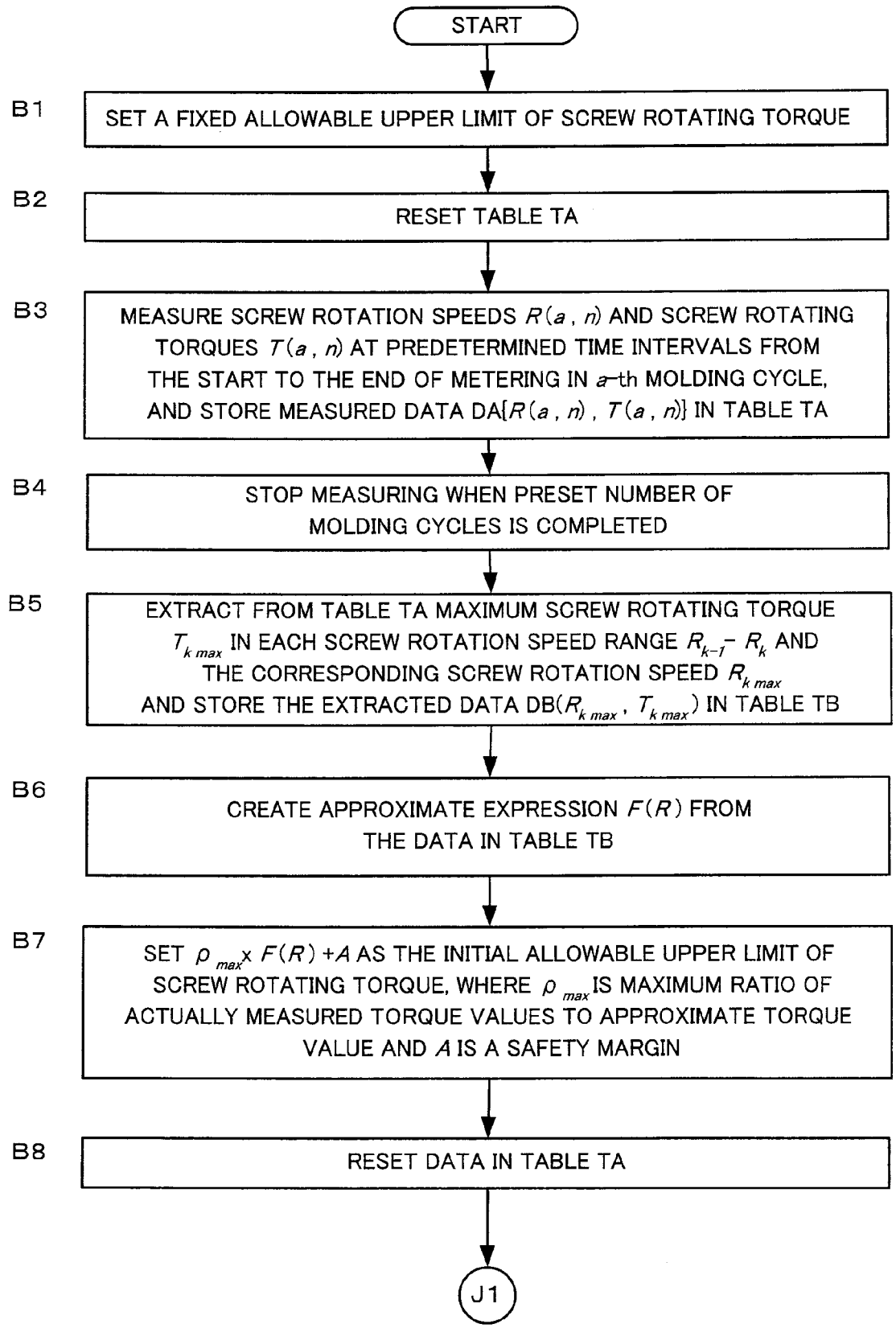
FIG. 7A is a flowchart illustrating a processing algorithm for setting allowable upper limits of screw rotating torque in a second embodiment of the present invention.
Figure 7B:
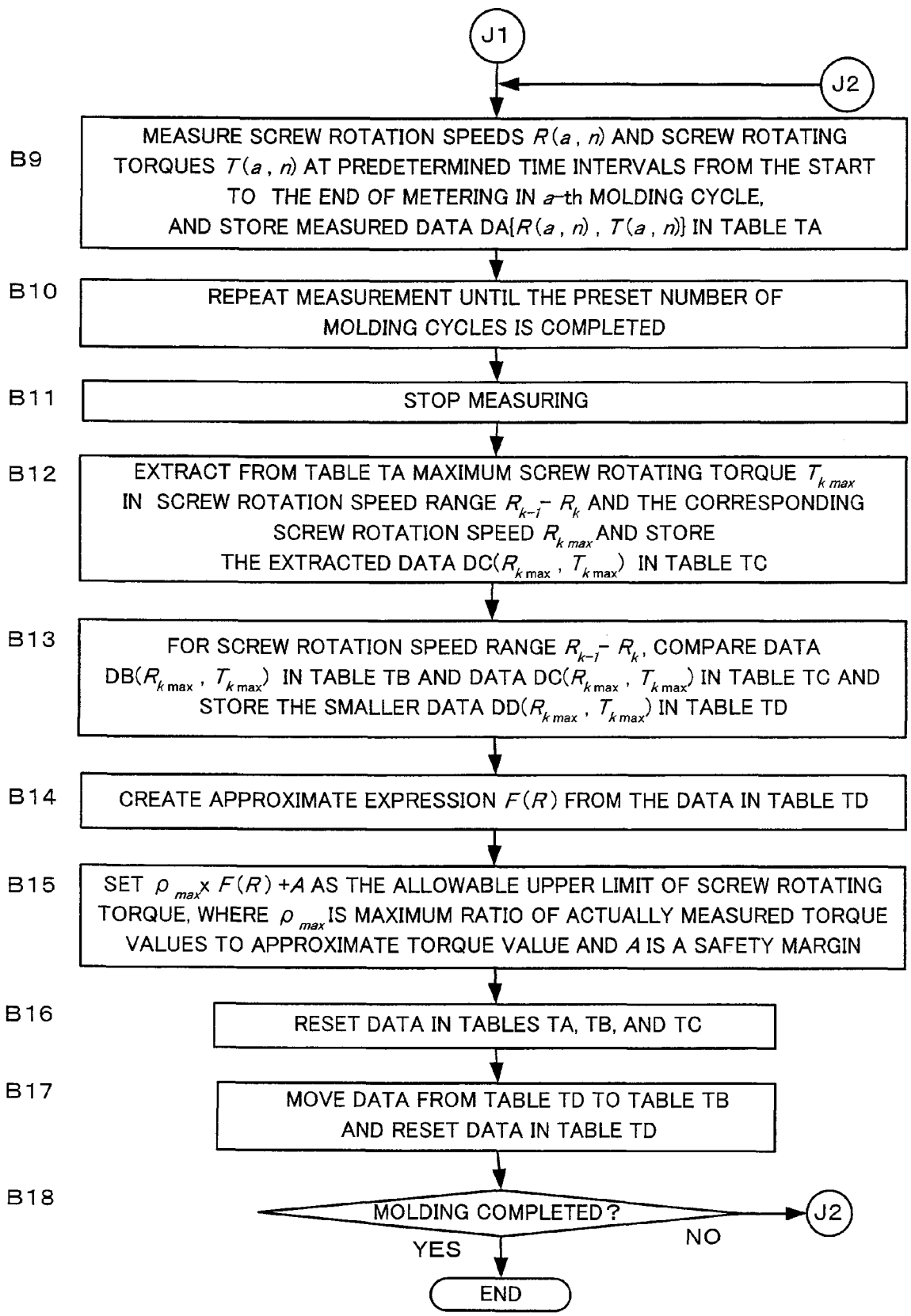
FIG. 7B is a flowchart continued from the flowchart in FIG. 7A.

FIGS. 7A and 7B show a flowchart illustrating a processing algorithm for setting allowable upper limits of screw rotating torque in a second embodiment of the present invention.

This flowchart will be described below step by step.

Step B1: Sets a fixed allowable upper limit of screw rotating torque.

Step B2: Resets the table TA (TABLE 5) in which screw rotation speeds and screw rotating torques are stored at predetermined time intervals from the start to the end of metering.

Step B3: Measures screw rotation speeds R(a,n) and screw rotating torques T(a,n) at preset time intervals ($t_0$, $t_1$, . . . , $t_n$, . . . ) from the start to the end of metering in a-th molding cycle (a=1, 0, . . . ) and stores the measured data DA {R(a,n), T(a,n)} in the table TA (TABLE 5).

Step B4: Stops measuring when the preset number of molding cycles is completed.

Step B5: Extracts the maximum screw rotating torque $T_{k\ max}$ in each screw rotation speed range $R_{k-1}$-$R_k$ and the corresponding screw rotation speed $R_{k\ max}$ from the table TA (TABLE 5) and stores the extracted data DB ($R_{k\ max}$, $T_{k\ max}$) in the table TB (TABLE 6).

Step B6: Creates an approximate expression F(R) from the data in the table TB (TABLE 6).

Step B7: Modifies F(R) by multiplying F(R) by the maximum ratio $\rho_{max}$ of the actually measured torque values to the approximate torque value, adds a safety margin A to the modified F(R), and sets the resultant value as the initial allowable upper limit of screw rotating torque.

Step B8: Resets the data in the table TA (TABLE 5).

Step B9: Measures screw rotation speeds R(a,n) and screw rotating torques T(a,n) at preset time intervals from the start to the end of metering in a-th molding cycle and stores the measured data DA {R(a,n), T(a,n)} in the table TA (TABLE 5).

Step B10: Repeats the measurement until the preset number of molding cycles is completed.

Step B11: Stops measuring.

Step B12: Extracts the maximum screw rotating torque value $T_{k\ max}$ in each screw rotation speed range $R_{k-1}$-$R_k$ and the corresponding screw rotation speed $R_{k\ max}$ from the table TA (TABLE 5) and stores the extracted data DC ($R_{k\ max}$, $T_{k\ max}$) in the table TC (TABLE 7).

Step B13: For each screw rotation speed range $R_{k-1}$-$R_k$, compares the data DB ($R_{k\ max}$, $T_{k\ max}$) in table TB (TABLE 6) and the data DC ($R_{k\ max}$, $T_{k\ max}$) in table TC (TABLE 7) and stores the smaller data in the table TD (TABLE 8) as the data DD ($R_{k\ max}$, $T_{k\ max}$).

Step B14: Creates an approximate expression F(R) from the data in the table TD (TABLE 8).

Step B15: Modifies F(R) by multiplying F(R) by the maximum ratio $\rho_{max}$ of the actually measured torque values to the approximate torque value, adds a safety margin A to the modified F(R), and sets the resultant value including the safety margin A as the allowable upper limit of screw rotating torque.

Step B16: Resets the data in the table TA (TABLE 5), table TB (TABLE 6), and table TC (TABLE 7).

Step B17: Moves the data from the table TD (TABLE 8) to the table TB (TABLE 6) and resets the data in the table TD (TABLE 8).

Step B18: Checks whether the preset number of molding cycles is completed; if not, returns to Step B9 (after processing of "a=a+1"). If completed, this setting processing ends.

Next, an injection molding machine in a third embodiment of the present invention will be described.

A fixed, allowable upper limit of screw rotating torque common to all the molding cycles is set, in addition to the allowable upper limit of screw rotating torque according to the present invention. The common (and fixed) allowable upper limit of screw rotating torque is set to a value with a sufficient margin. The allowable upper limit of screw rotating torque according to the present invention is set under conditions in which screw operation is limited by the common (and fixed) allowable upper limit of screw rotating torque.

First, measurement is initiated to set an initial allowable upper limit of screw rotating torque. The term "initial allowable upper limit of screw rotating torque" refers to the allowable upper limit of screw rotating torque that is set on the basis of the data obtained by repeatedly measuring screw rotating torques Tn at screw rotation speeds Rn for the preset number of molding cycles starting immediately after actual molding is initiated.

To set a precise allowable upper limit of screw rotating torque, data from more molding cycles is required. However, the initial allowable upper limit of screw rotating torque obtained from the torque values in actual molding operations is a value below the common (and fixed) allowable upper limit of screw rotating torque and useful to limit screw rotating operation before a higher torque is applied to the screw.

An example of setting the initial allowable upper limit of screw rotating torque is described below. In this example, the initial allowable upper limit of screw rotating torque is set on the basis of the data measured during initial five molding cycles from the start of molding.

First, screw rotation speeds R(a,n) and screw rotating torques T(a,n) are measured at preset time intervals (time $t_0$, $t_1, \ldots, t_n, \ldots$) from the start to the end of metering in a-th molding cycle (a=1, 2, ... 5) and the measured data DA {R(a,n), T(a,n)} is stored in a table TA (TABLE 9).

Once the fifth molding cycle is completed, an approximate expression F(R) representing the relationship between the screw rotation speeds R(a,n) and the screw rotating torques T(a,n) is determined from the group of data stored in the table TA (TABLE 9). With many types of resin, the screw rotating torque in injection molding tends to increase as the screw rotation speed increases and the screw rotating torque is obviously 0 when the screw rotation speed is 0, so it is suitable to apply the approximate expression F(R) to a monotonously increasing function that passes through the origin.

Suitable functions include exponent functions (mathematical expression 11) including linear and quadratic functions. With some types of resins, the screw rotating torque does not tend to increase with the increase in screw rotation speed, in which case an n-dimensional polynomial (mathematical expression 3) is applied to the approximate expression F(R). To select a suitable function, an optimal order n is experimentally determined from actual molding operations, taking into account the computational capacity of the injection molding machine.

$$F(R)=aR^n \quad (11)$$

In the third embodiment, the approximate expression F(R) is approximated by an irrational function. First, a value of $a_1$ in the mathematical expression 12 is determined using the least-squares method. The resultant approximate expression is the following mathematical expression 12

$$F_1(R)=a_1\sqrt{R} \quad (12)$$

Assuming that the number of data is assumed to be m, the residual sum of squares is a mathematical expression 13:

$$S_e = \sum_{i=1}^{m} r^2 = \sum_{i=1}^{m} (F(R) - a_1\sqrt{R})^2 \quad (13)$$

Here, the value of $a_1$ that minimizes Se is determined. The mathematical expression 12 being an approximate expression, all the actually measured screw rotating torque values T do not necessarily satisfy $T<F1(R)=a_1\sqrt{R}$. Accordingly, all the screw rotation speeds R(a,n) extracted from the data stored in the table TA are substituted into the mathematical expression 12 to determine torque values F{R(a,n)} by an approximate expression, to determine ratios $\rho_1$ of the actually measured screw rotating torque values T to the torque values F{R(a,n)}. Then, the maximum value $\rho_{1max}$ of the ratios $\rho_1$ is determined and multiplied by F1(R). Namely, F1(R)=$\rho_{1max} \cdot a_1\sqrt{R}$ represents an envelope curve including the maximum values of the data group in the table TA (TABLE 9). Furthermore, a safety margin A is added to the value of the envelop curve and the resultant value is set as the initial allowable upper limit of screw rotating torque $T_{1\ max}$.

$$1 \le \rho_1 = \frac{T}{F\{R(a, n)\}} \quad (14)$$

$$T_{1max} = \rho_{1max} a_1 \sqrt{R} + A \quad (15)$$

As described above, the initial allowable upper limit of screw rotating torque determined from the screw rotating torques during actual injection molding operations, despite the limited number of data, is below the common (and fixed) allowable upper limit of screw rotating torque and is sufficiently effective for preventing breakage of the screw.

To set more precisely an allowable upper limit of screw rotating torque, measurement is performed as follows. The number of molding cycles to be set is increased to collect more amount of data and screw rotating torques Tn are measured at screw rotation speeds Rn, similarly to the above case in which the initial allowable upper limit of screw rotating torque is set on the basis of the data from the five molding cycles.

First, the number of molding cycles to be set in advance is increased so as to increase the amount of date to be collected, and then the table TA (TABLE 9) is reset.

Screw rotation speeds R(a,n) and screw rotating torques T(a,n) are measured at preset time intervals from the start to the end of metering and the measured data DA {R(a,n), T(a, n)} is stored in the table TA (TABLE 9). The measurement is repeated and the measured data is repeatedly stored in the table TA (TABLE 9) until the preset number of molding cycles is completed. An approximate expression (mathematical expression 16) representing the relationship between the screw rotation speeds R(a,n) and the screw rotating torques T(a,n) is determined from the group of data stored in the preset table TA (TABLE 9). The approximate expression is determined and the allowable upper limit of screw rotating torque T2 max is set as described above.

This process for measuring and storing screw rotating torques at screw rotation speeds is repeated until the preset number of molding cycles is completed.

$$F_2(R) = a_2\sqrt{R} \qquad (16)$$

$$1 \le \rho_2 = \frac{T}{F_2\{R(a,n)\}} \qquad (17)$$

$$T_{2max} = \rho_{2max} a_2 \sqrt{R} + A \qquad (18)$$

Here, the allowable upper limit of screw rotating torque $T_{2\ max}$ is compared with the initial allowable upper limit of screw rotating torque. If $\rho_{1max} \cdot a_1$ is greater than $\rho_{2max} \cdot a_2$, the following relationship is established in the entire range of screw rotation speeds:

$T_{1\ max} = \rho_{1max} \cdot a_1 \sqrt{R} + A$ (mathematical expression 15)>$T_{2max} = \rho_{2max} \cdot a_2 \sqrt{R} + A$ (mathematical expression 18).

Figure 11:
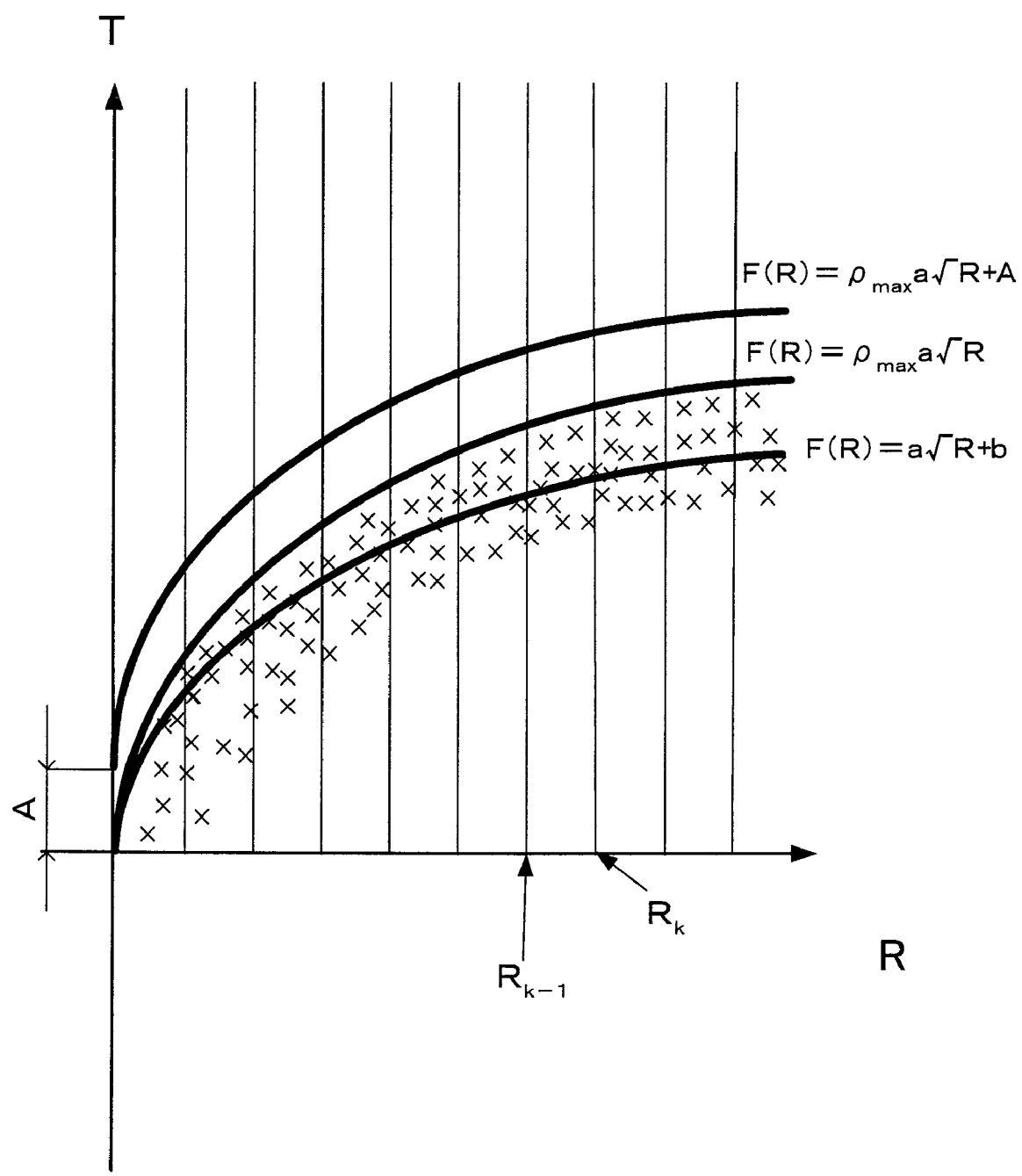
FIG. 11 is a graph showing the relationship between screw rotation speeds and screw rotating torques, as well as the allowable upper limits of screw rotating torque to be set by approximate expressions.

In this case, the $T_{2max} = \rho_{2max} \cdot a_2 \sqrt{R} + A$ (mathematical expression 18) that can limit the screw rotating torque to a lower level is set as the allowable upper limit of screw rotating torque $T_{max}$ (See FIG. 11).

$$T_{max} = \rho_{max} a \sqrt{R} + A \qquad (19)$$

An allowable upper limit of screw rotating torque at each moment of metering is determined by substituting the screw rotation speed at each moment of metering into the mathematical expression 15 or 18, which are approximate expressions that provide the allowable upper limit of screw rotating torque $T_{max}$. If a screw rotating torque exceeding this allowable upper limit is detected, the screw operation is stopped or changed so that the screw rotating torque is reduced to a value equal to or below the allowable upper limit.

Alternatively, the allowable upper limit of screw rotating torque at each moment of metering may be determined by substituting the screw rotation speed set for metering into the mathematical expression 15 or 18 which are approximate expressions. If a screw rotating torque exceeding this allowable upper limit is detected, the screw operation is stopped or changed so that the screw rotating torque is reduced to a value equal to or below the allowable upper limit.

Once the allowable upper limit of screw rotating torque $T_{max}$ is set, the number of molding cycles for setting the allowable upper limit of screw rotating torque $T_{max}$ is reset and measurement is initiated again. Until the preset number of molding cycles is completed, the measurement is repeated and the measured data is repeatedly stored in the table TA (TABLE 9). Once the preset number of molding cycles is completed, an approximate expression representing the relationship between the screw rotation speeds $R(a,n)$ and the screw rotating torques $T(a,n)$ is determined. Subsequently, as long as molding continues, the measurement is repeated and the allowable upper limit of screw rotating torque is repeatedly updated.

The value of a in $T=F(R)=a\sqrt{R}$ may be obtained from all the data measured until the preset number of molding cycles is completed and the maximum value $a_{max}$ of the values a may be used instead of a in $T=F(R)=a\sqrt{R}$, so $F(R)=a_{max}\sqrt{R}$ represents an envelope curve including the maximum values of the group of data in the table TA (TABLE 9). Instead of adding a safety margin A to $\rho_{max} \cdot a\sqrt{R}$, a safety coefficient B may be multiplied by $p_{max} \cdot a\sqrt{R}$ in mathematical expression 19 to set $T_{max} = B \cdot a_{max} \cdot a\sqrt{R}$.

TABLE 9

TABLE TA

|  | 1 | 2 | ... | A | ... | i |
|---|---|---|---|---|---|---|
| $t_0$ | DA{R(1, 0), T(1, 0)} | DA{R(2, 0), T(2, 0)} | ... | DA{R(a, 0), T(a, 0)} | ... | DA{R(i, 0), T(i, 0)} |
| $t_1$ | DA{R(1, 1), T(1, 1)} | DA{R(2, 1), T(2, 1)} | ... | DA{R(a, 1), T(a, 1)} | ... | DA{R(i, 1), T(i, 1)} |
| $t_2$ | DA{R(1, 2), T(1, 2)} | DA{R(2, 2), T(2, 2)} | ... | DA{R(a, 2), T(a, 2)} | ... | DA{R(i, 2), T(i, 2)} |
| — | — | — | ... | — | ... | — |
| $t_n$ | DA{R(1, n), T(1, n)} | DA{R(2, n), T(2, n)} | ... | DA{R(a, n), T(a, n)} | ... | DA{R(i, n), T(i, n)} |
| — | — | — | ... | — | ... | — |
| $t_j$ | DA{R(1, j), T(1, j)} | DA{R(2, j), T(2, j)} | ... | DA{R(a, j), T(a, j)} | ... | DA{R(i, j), T(i, j)} |

Figure 8:
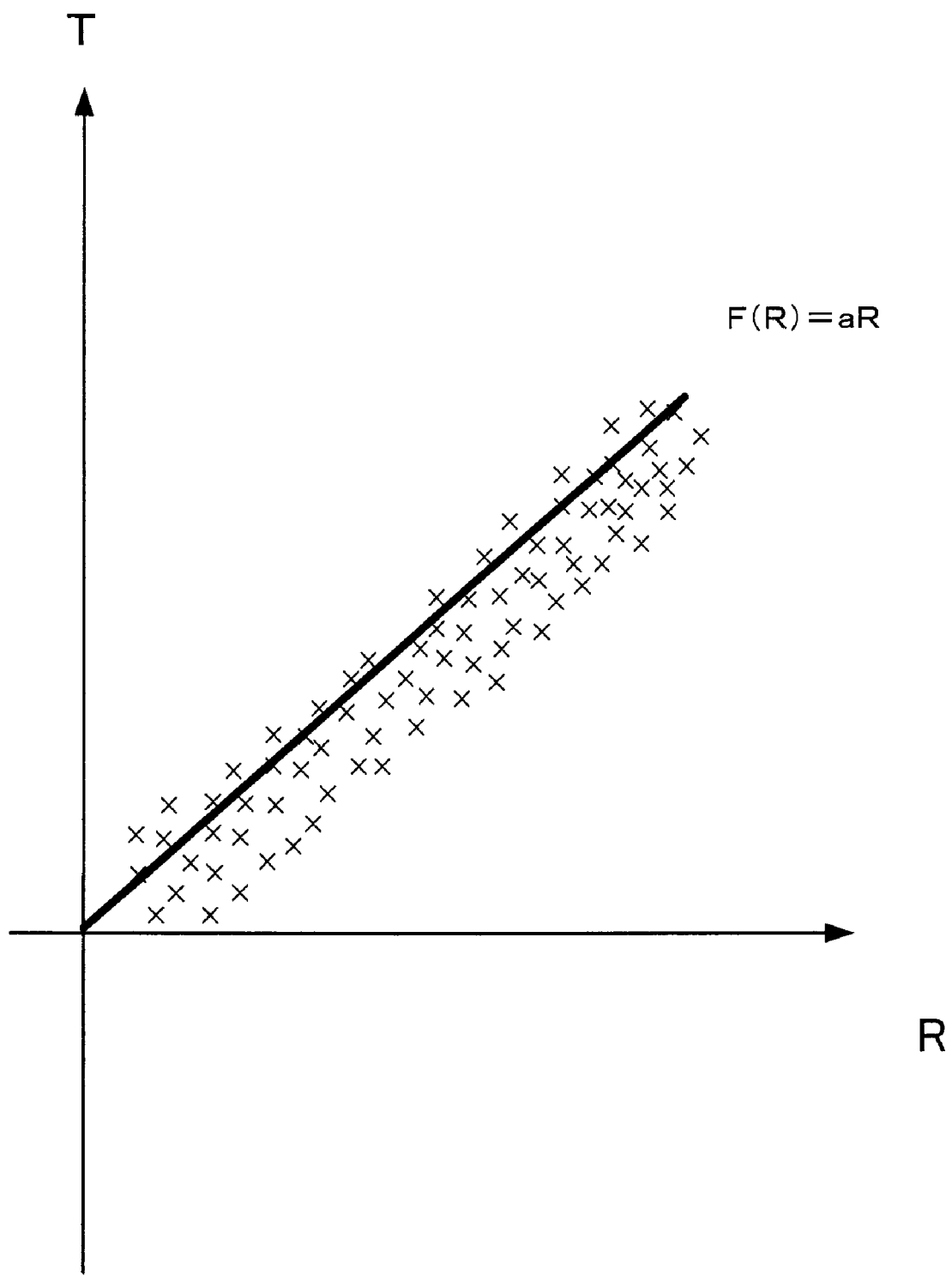
FIG. 8 is a graph showing that the approximate expression representing the relationship between screw rotation speeds $R_{k\ max}$ and maximum screw rotating torques $T_{k\ max}$ is a monotonously increasing linear function.

FIG. 8 is a graph showing that the approximate expression representing the relationship between screw rotation speeds $R_{k\ max}$ and maximum screw rotating torques $T_{k\ max}$ is a monotonously increasing linear function.

Figure 9:
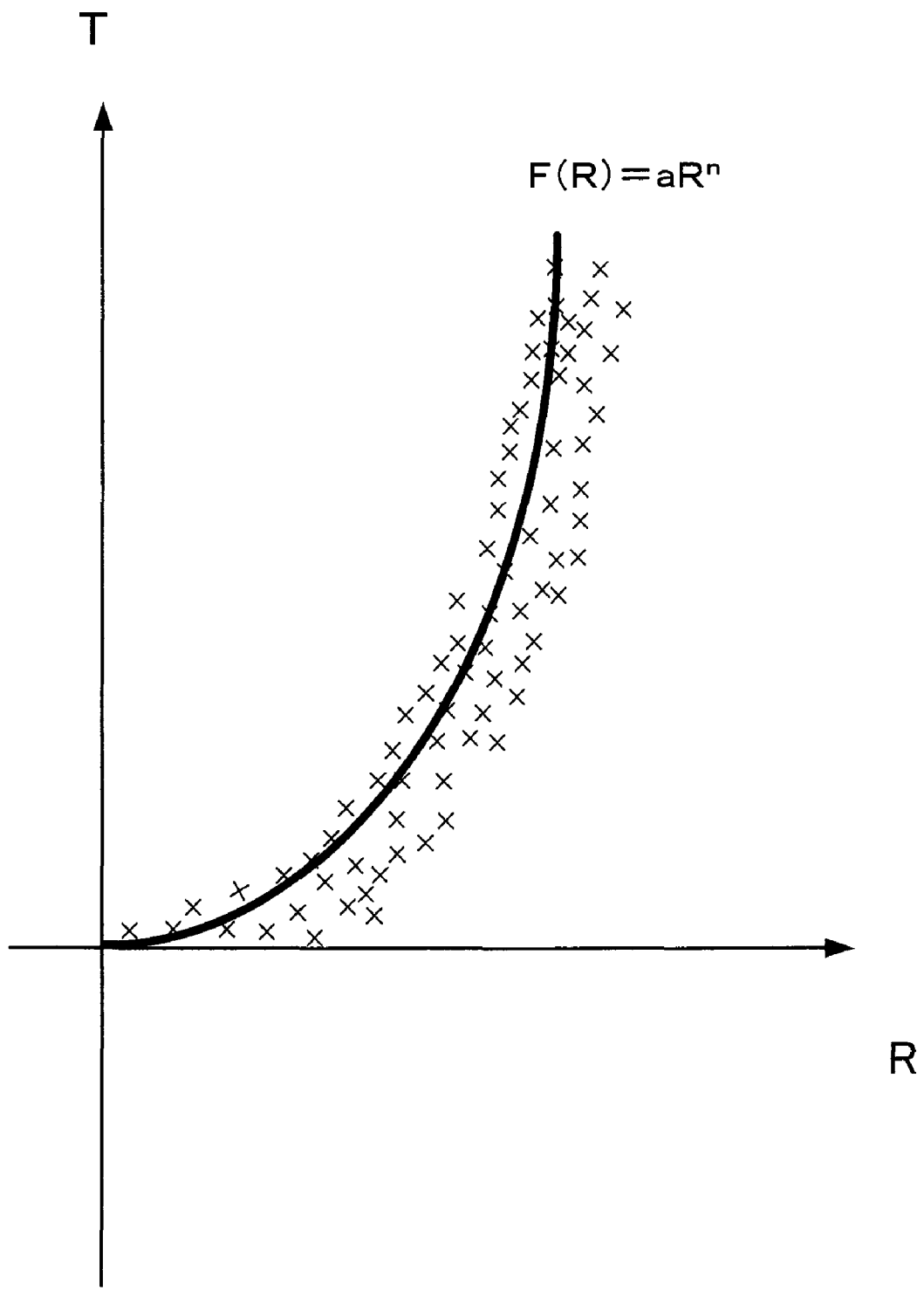
FIG. 9 is a graph showing that the approximate expression representing the relationship between screw rotation speeds $R_{k\ max}$ and maximum screw rotating torques $T_{k\ max}$ is an n-dimensional function (n>1)

FIG. 9 is a graph showing that the approximate expression indicating the relationship between screw rotation speeds $R_{k\ max}$ and maximum screw rotating torques $T_{k\ max}$ is an n-dimensional function (n>1) such as a quadratic function.

Figure 10:
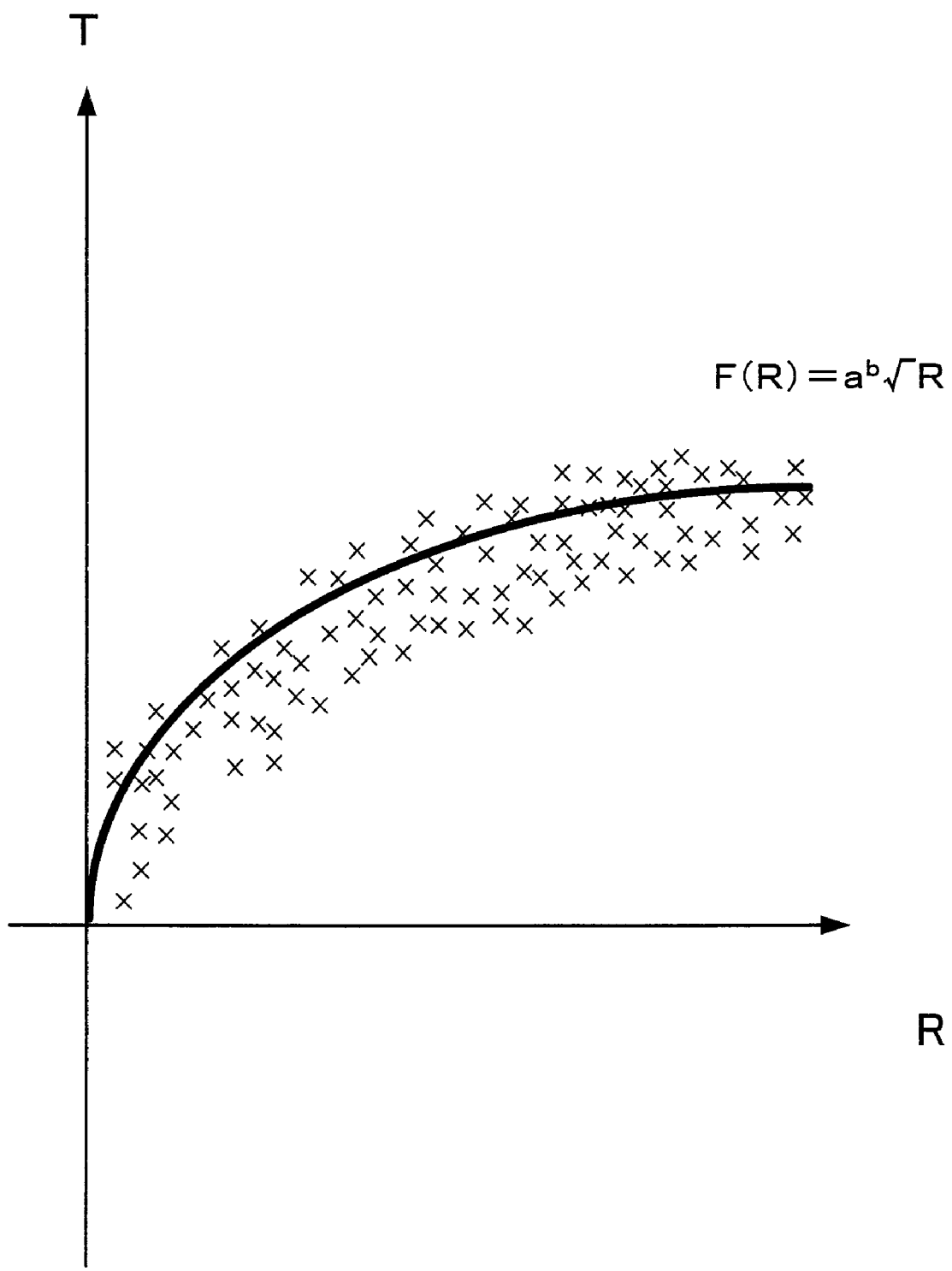
FIG. 10 is a graph showing that the approximate expression representing the relationship between screw rotation speeds $R_{k\ max}$ and maximum screw rotating torques $T_{k\ max}$ is an irrational function.

FIG. 10 is a graph showing that the approximate expression indicating the relationship between screw rotation speeds $R_{k\ max}$ and maximum screw rotating torques $T_{k\ max}$ is an irrational function such as a square root function.

FIG. 11 is a graph showing the relationship between screw rotation speeds and screw rotating torques, as well as the allowable upper limits of screw rotating torque to be set by the approximate expressions.

Figure 12A:
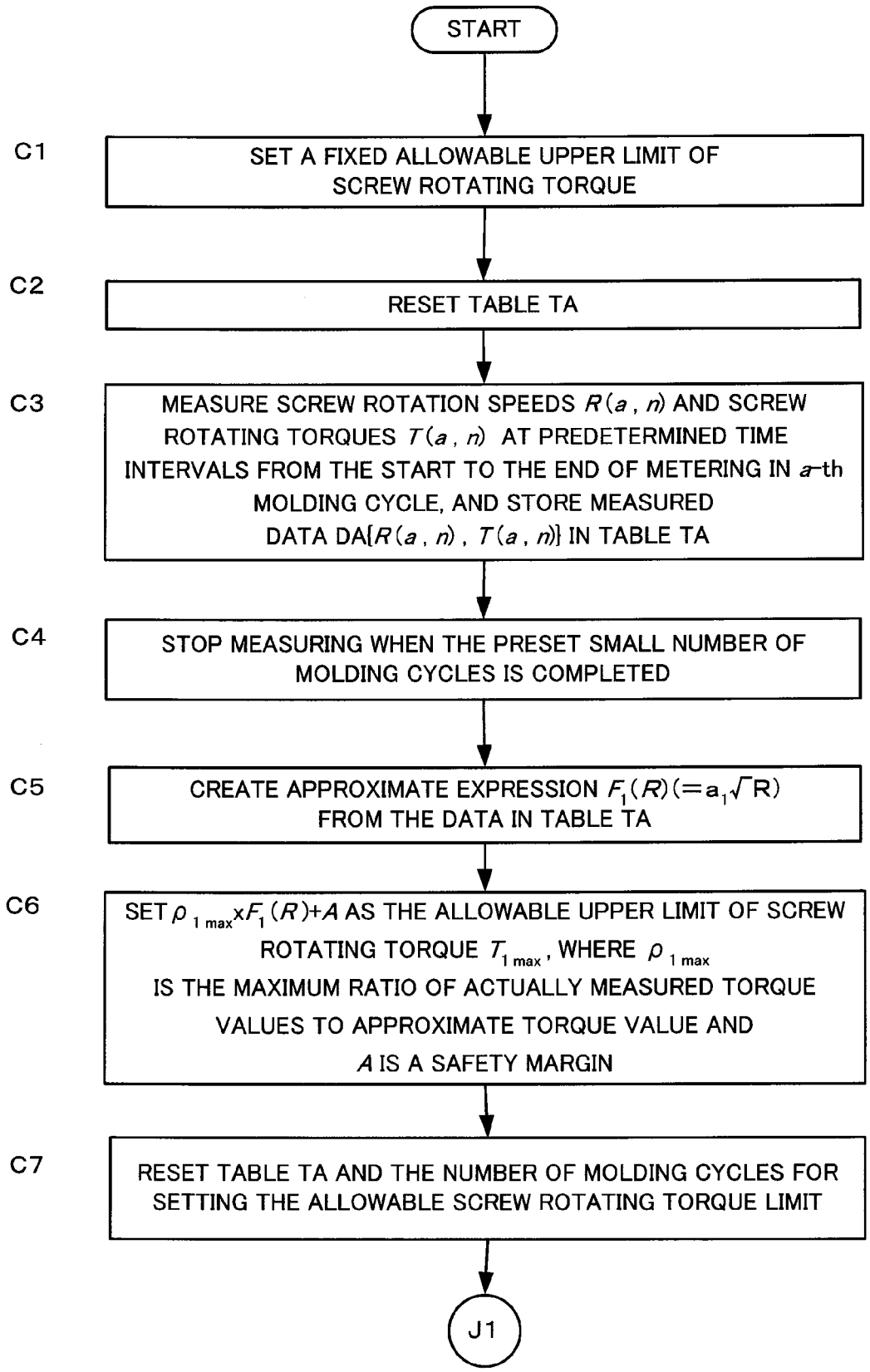
FIG. 12A is a flowchart illustrating a processing algorithm for setting allowable upper limits of screw rotating torque in a third embodiment of the present invention.
Figure 12B:
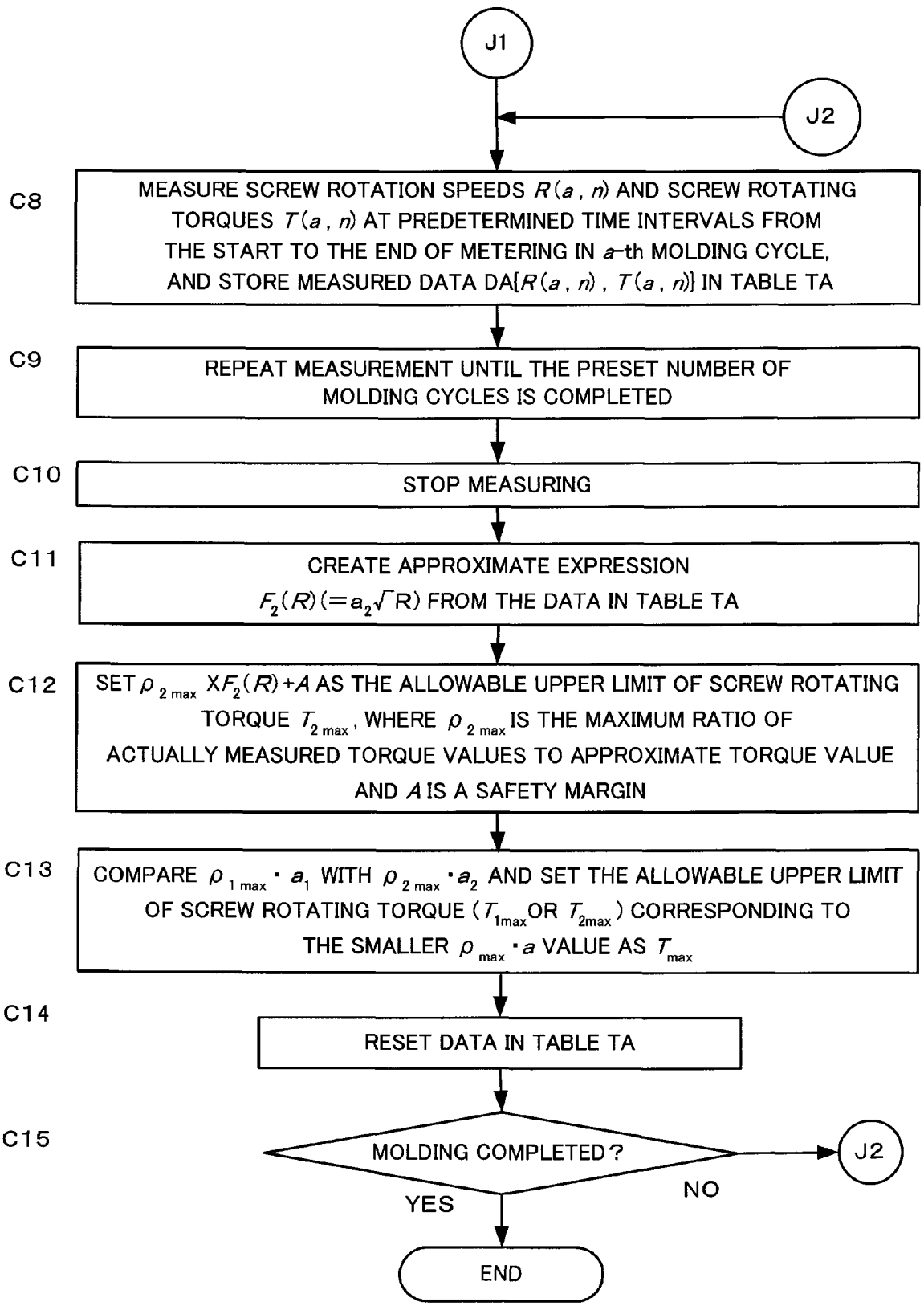
FIG. 12B is a flowchart continued from the flowchart in FIG. 12A.

FIGS. 12A and 12B show a flowchart illustrating a processing algorithm for setting an allowable upper limit of screw rotating torque in the above third embodiment of the present invention.

This flowchart will be described below step by step.

Step C1: Sets a fixed allowable upper limit of screw rotating torque.

Step C2: Resets the table TA (TABLE 9) in which screw rotation speeds and screw rotating torques are stored at predetermined time intervals from the start to the end of metering.

Step C3: Measures screw rotation speeds $R(a,n)$ and screw rotating torques $T(a,n)$ at preset time intervals ($t_0, t_1, \ldots, t_n, \ldots$) from the start to the end of metering in a-th molding cycle (a=1, 2, ...) and stores the measured data DA {R(a,n), T(a,n)} in the table TA (TABLE 9).

Step C4: Stops measuring when the preset small number of molding cycles is completed.

Step C5: Creates an approximate expression F1(R) from the data in the table TA (TABLE 9).

Step C6: Modifies F1(R) by multiplying F1(R) by the maximum ratio $\rho_{1max}$ between the actually measured torque values and the approximate torque value, adds a safety margin A to the modified F1(R), and sets the resultant value as the allowable upper limit of screw rotating torque $T_{1\ max}$.

Step C7: Resets the data in the table TA (TABLE 9). The number of molding cycles for setting the allowable screw rotating torque limit is reset.

Step C8: Measures screw rotation speeds R(a,n) and screw rotating torques T(a,n) at preset time intervals from the start to the end of metering in a-th molding cycle and stores the measured data DA {R(a,n), T(a,n)} in the table TA (TABLE 9).

Step C9: Repeats the measurement until the preset number of molding cycles is completed.

Step C10: Stops measuring.

Step C11: Creates an approximate expression F2(R) from the data in the table TA (TABLE 9).

Step C12: Modifies F2(R) by multiplying F2(R) by the maximum ratio $\rho_{2max}$ between the actually measured torque values and the approximate torque value, adds a safety margin A to the modified F2(R), and sets the resultant value as the allowable upper limit of screw rotating torque $T_{2max}$.

Step C13: Compares the $\rho_{1max} \cdot a_1$ used to set the initial allowable upper limit of screw rotating torque $T_{1\ max}$ $(=\rho_{1max} \cdot a_1 \sqrt{R} + A)$ and the $\rho_{2max} \cdot a_2$ used to set the allowable upper limit of screw rotating torque $T_{2\ max}(=\rho_{2max} \cdot a_2 \sqrt{R} + A)$ and sets the smaller value ($T_{1\ max}$ or $T_{2\ max}$) as the screw rotating torque limit $T_{max}$.

Step C14: Resets the data in the table TA (TABLE 9).

Step C15: Checks whether the preset number of molding cycles is completed; if not, returns to Step C8 (after processing of "a=a+1"). If completed, this setting processing ends.

In the above embodiments 1 through 3, the items to be measured repeatedly until the preset number of molding cycles is completed may be the screw rotation speeds and screw rotating torques along the preset distance the screw moves.

In the above embodiments 1 through 3, when the screw rotates in both the forward and backward directions during metering, the allowable upper limit of screw rotating torque for the screw rotating in the backward direction may be set from the screw rotating torques measured when the screw is rotating in the backward direction.

In the above embodiments 1 through 3, if molding is interrupted, the allowable upper limit of screw rotating torque effective so far may be stored in a mold file, so that when the mold file is read, the stored allowable upper limit of screw rotating torque is set to protect the screw under the same conditions as those effective immediately after the molding is interrupted. Furthermore, when the mold file is read, whether the allowable upper limit of screw rotating torque will or will not be repeatedly updated may be selected.

In the above embodiments 1 through 3, when resin or any of the metering conditions (screw rotation speed, back pressure for metering, cylinder temperature, etc.) is changed, it is desirable to reset the allowable upper limit of screw rotating torque that is repeatedly updated until the resin or condition is changed and to set an initial allowable upper limit of screw rotating torque under the conditions in which screw operation is limited by the fixed allowable upper limit of screw rotating torque.

In the above embodiments 1 through 3, if a screw rotating torque exceeding an allowable upper limit is detected after the allowable upper limit is set, screw operation is stopped or changed so that the screw rotating torque is reduced to a value equal to or below the allowable upper limit. Instead, the driving torque of a driving means such as an electric motor for rotating the screw may be limited to the allowable upper limit.

Figure 13:
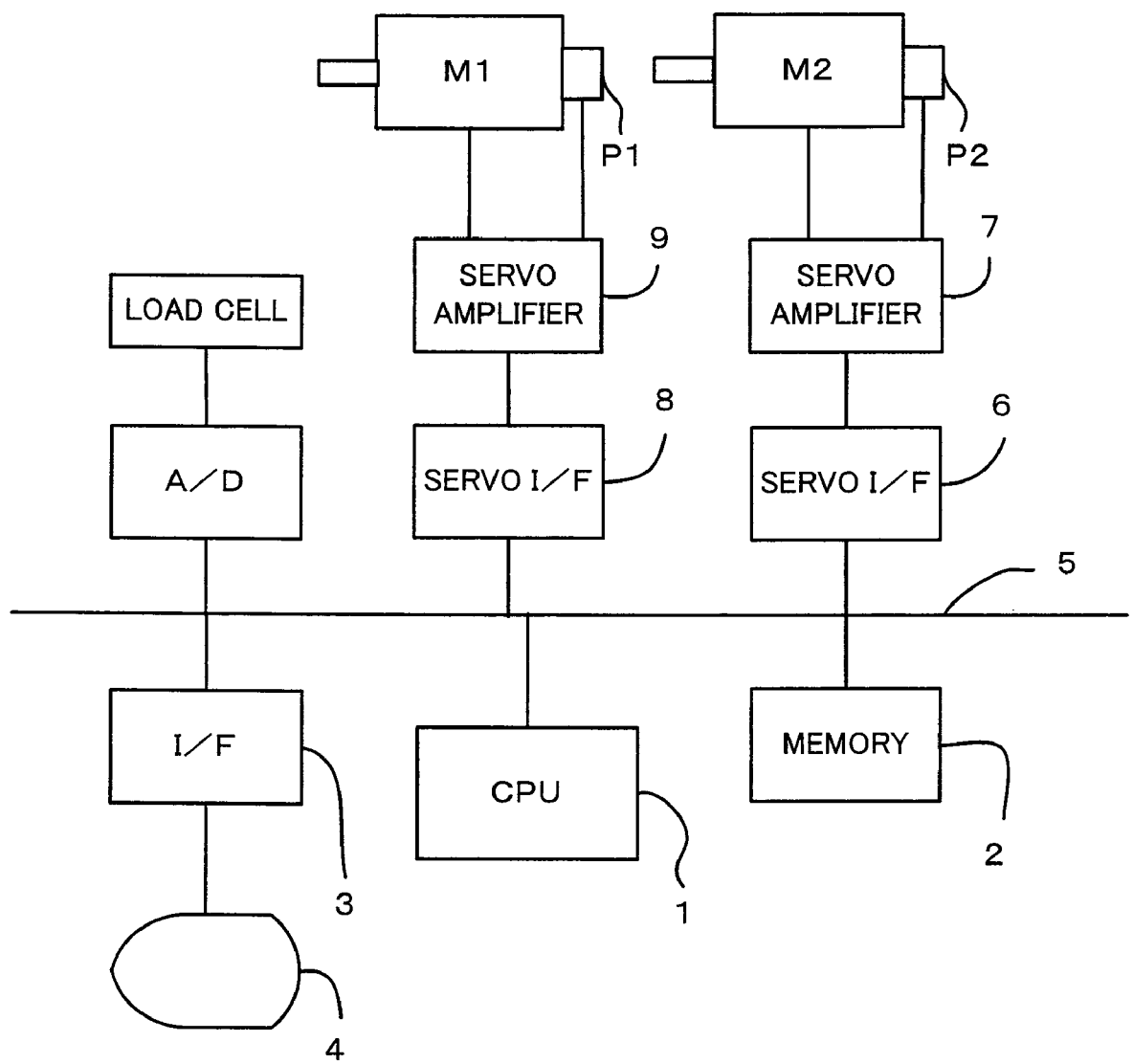
FIG. 13 is a block diagram showing the main sections of an exemplary injection molding machine having a function for monitoring screw rotating torques according to the present invention.

FIG. 13 is a block diagram showing the main sections of an example of an injection molding machine having function to monitor screw rotating torques according to the present invention.

A processor 1 controls the injection molding machine as a whole. An input/output interface 3, servo interfaces 6, 8, and a memory 2 including ROM, RAM, and nonvolatile RAM is connected to the processor 1 through a bus 5. The memory 2 stores a program for achieving the screw rotating torque monitoring function according to the present invention. Servomotors M2, M1 are connected to the servo interfaces 6, 8, respectively. The servomotors include a screw rotating servomotor M1 and an injection servomotor M2.

The servomotor M1 and an encoder P1 acting as a speed sensor are connected to a servo amplifier 9. The encoder P1 senses the rotational speed of the servomotor M1 and thus the rotational speed of the screw in the injection molding machine (not shown). The servomotor M2 and an encoder P2 acting as a position/speed sensor are connected to a servo amplifier 7. The encoder P2 senses the rotational position and rotational speed of the servomotor M2 and thus the position and speed of the screw moving in the forward and backward directions.

The screw rotating torque can be obtained by measuring the amount of driving current flowing through the servomotor M1, or by incorporating a disturbance estimating observer in the servo amplifier 9. The description of the processing of the disturbance estimating observer is omitted, which is a known technique.

A data input/output device 4 with a display unit including a liquid crystal display or the like is connected to the input/output interface 3. The input/output device 4 accepts various commands and parameters to be set. The display unit displays various settings, screw rotation speeds, screw positions, screw rotating torques, and the like.

The invention claimed is:

1. An injection molding machine having a function for monitoring screw rotating torques, comprising:
    measuring means for measuring screw rotation speeds and screw rotating torques at predetermined time or distance intervals as the screw moves for metering;
    storage means for storing the screw rotation speeds and screw rotating torques measured by the measuring means;
    determining means for determining a maximum screw rotating torque at each screw rotation speed by substituting the screw rotation speeds and screw rotating torques stored in the storage means into a previously-assumed function;
    allowable upper limit setting means for setting an allowable upper limit of screw rotating torque for each screw rotation speed on the basis of the maximum screw rotating torque determined by the determining means; and
    screw rotation stopping/changing means for stopping or changing the screw rotating operation when a screw rotating torque exceeding the allowable upper limit is detected during metering after the allowable upper limit is set.

2. An injection molding machine having a function for monitoring screw rotating torques, comprising:
    measuring means for measuring screw rotation speeds and screw rotating torques at predetermined time or distance intervals as the screw moves for metering;

storage means for storing the screw rotation speeds and screw rotating torques measured by the measuring means;

determining means for determining a maximum screw rotating torque at each screw rotation speed by substituting the screw rotation speeds and screw rotating torques stored in the storage means into a previously-assumed function;

allowable upper limit setting means for setting an allowable upper limit of screw rotating torque for each screw rotation speed on the basis of the maximum screw rotating torque determined by the determining means; and limiting means for limiting a driving torque applied to the screw to the allowable upper limit set by the allowable upper limit setting means.

3. An injection molding machine having a function for monitoring screw rotating torques, comprising:

measuring means for measuring screw rotation speeds and screw rotating torques at predetermined time or distance intervals as the screw moves for metering;

storage means for storing the screw rotation speeds and screw rotating torques measured by the measuring means for a predetermined number of molding cycles;

approximate expression determining means for determining an approximate expression that represents a relationship between a maximum screw rotating torque and a screw rotation speed at the maximum screw rotating torque by substituting the screw rotation speeds and screw rotating torques stored in the storage means to a previously-assumed function;

allowable upper limit setting means for setting an allowable upper limit of screw rotating torque by substituting the screw rotation speed to the approximate expression determined by the approximate expression determining means; and screw rotation stopping/changing means for stopping or changing screw rotation when a screw rotating torque exceeding the allowable upper limit is detected during metering after the allowable upper limit is set.

4. An injection molding machine having a function for monitoring screw rotating torques, comprising:

measuring means for measuring screw rotation speeds and screw rotating torques at predetermined time or distance intervals as the screw moves for metering;

storage means for storing the screw rotation speeds and screw rotating torques measured by the measuring means for a predetermined number of molding cycles;

approximate expression determining means for determining an approximate expression that represents a relationship between a maximum screw rotating torque and a screw rotation speed at the maximum screw rotating torque by substituting the screw rotation speeds and screw rotating torques stored in the storage means to a previously-assumed function;

allowable upper limit setting means for setting an allowable upper limit of screw rotating torque by substituting the screw rotation speed to the approximate expression determined by the approximate expression determining means; and limiting means for limiting a driving torque applied to the screw to the allowable upper limit set by the allowable upper limit setting means.

5. The injection molding machine having the function for monitoring screw rotating torques according to any one of the claims 1-4, further comprising updating means for updating the upper limit of screw rotating torque on the basis of screw rotation speeds and screw rotating torques measured at predetermined time or distance intervals as the screw moves for metering after the allowable upper limit of screw rotating torque is set.

6. The injection molding machine having the function for monitoring screw rotating torques according to any one of the claims 1-4, wherein the upper limit of screw rotating torque is set for each of the forward and backward directions in which the screw rotates.

7. The injection molding machine having the function for monitoring screw rotating torques according to any one of the claims 1-4, further comprising storage means for storing the allowable upper limit of screw rotating torque that is set by the allowable upper limit setting means, in association with mold information.

8. The injection molding machine having the function for monitoring screw rotating torques according to any one of the claims 1-4, further comprising function selecting means for selecting a function from a plurality of previously-assumed functions that are prepared.

9. The injection molding machine having the function for monitoring screw rotating torques according to claim 3 or 4, wherein the allowable upper limit of screw rotating torque is set by adding a certain value to the maximum screw rotating torque or by multiplying the maximum screw rotating torque by a certain coefficient.

* * * * *